United States Patent
Agarwal et al.

(10) Patent No.: US 12,111,734 B2
(45) Date of Patent: Oct. 8, 2024

(54) PROTECTION GROUPS FOR BACKING UP CLOUD-BASED KEY-VALUE STORES

(71) Applicant: Clumio, Inc., Sunnyvale, CA (US)

(72) Inventors: Chandan Sajjan Agarwal, Sunnyvale, CA (US); Raghav Anand, New York, NY (US); Aniruddh Poornabodha Bharadwaj, San Francisco, CA (US); Deepak Chawla, Mountain View, CA (US); Xia Hua, Mountain View, CA (US); Woonho Joseph Jung, Cupertino, CA (US); Michal Stanislaw Ostrowski, Cedar Park, TX (US); Hung Hing Anthony Pang, San Jose, CA (US); Kanwaljeet Sachdev, San Jose, CA (US); Deepan Balajhi Saravanan, San Francisco, CA (US); Richa Sehgal, Sunnyvale, CA (US); Maadhav Kaushal Shah, San Francisco, CA (US); Nicholas Gerald Zehender, San Jose, CA (US)

(73) Assignee: Clumio, Inc., Santa Clara, CA (US)

( * ) Notice: Subject to any disclaimer, the term of this patent is extended or adjusted under 35 U.S.C. 154(b) by 25 days.

(21) Appl. No.: 17/929,591

(22) Filed: Sep. 2, 2022

(65) Prior Publication Data
US 2023/0315577 A1   Oct. 5, 2023

Related U.S. Application Data

(60) Provisional application No. 63/362,439, filed on Apr. 4, 2022.

(51) Int. Cl.
*G06F 11/14* (2006.01)

(52) U.S. Cl.
CPC ...... *G06F 11/1451* (2013.01); *G06F 11/1461* (2013.01); *G06F 11/1464* (2013.01); *G06F 2201/84* (2013.01)

(58) Field of Classification Search
CPC ............ G06F 11/1464; G06F 11/1451; G06F 11/1461; G06F 2201/84
See application file for complete search history.

(56) References Cited

U.S. PATENT DOCUMENTS

| 10,635,545 B1* | 4/2020 | Bono ............. G06F 16/219 |
| 2011/0252192 A1* | 10/2011 | Busch ............. G06F 16/23 711/E12.016 |

(Continued)

FOREIGN PATENT DOCUMENTS

CN   115658382 A   *   1/2023

OTHER PUBLICATIONS

Oct. 2023—How to Search an S3 Bucket_ A Complete Guide _ Shade—https://www.shade.inc/tools/how-to-search-an-s3-bucket (Year: 2023).*

(Continued)

*Primary Examiner* — Bryce P Bonzo
*Assistant Examiner* — Michael Xu
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to providing protection groups and rapid determination of expired objects and associated storage resources in a cloud-based backup storage context. In various embodiments, the disclosed techniques include generating, by a computing system, incremental backup data for a backup based on protection group information, including a set of cloud-based key-value data store buckets, filter information, and policy information. Dis- (Continued)

closed techniques also include rapid determination of expired objects and associated storage resources. Disclosed techniques may advantageously provide a centralized view across buckets, accounts, and regions and allow users to target specific subsets of their data stores for backup, which may improve performance and reduce backup storage costs, relative to traditional techniques.

18 Claims, 25 Drawing Sheets

(56) References Cited

U.S. PATENT DOCUMENTS

| | | | |
|---|---|---|---|
| 2014/0181438 A1 | 6/2014 | Varadharajan et al. | |
| 2014/0310247 A1 | 10/2014 | Vijayan et al. | |
| 2016/0203145 A1* | 7/2016 | Haviv | G06F 3/0685 707/694 |
| 2017/0010941 A1 | 1/2017 | Shimada et al. | |
| 2019/0278663 A1* | 9/2019 | Mehta | G06F 3/0605 |
| 2020/0241967 A1* | 7/2020 | Dain | G06F 11/0793 |
| 2020/0311039 A1* | 10/2020 | Gupta | G06F 16/9027 |
| 2021/0096958 A1 | 4/2021 | Kumar et al. | |
| 2021/0406129 A1* | 12/2021 | Zheng | G06F 11/1458 |
| 2022/0229733 A1* | 7/2022 | Chitloor | G06F 11/1464 |
| 2022/0229735 A1* | 7/2022 | Chopra | G06F 11/1464 |
| 2022/0283707 A1* | 9/2022 | Ayzenberg | G06F 11/1451 |

OTHER PUBLICATIONS

Office Action in U.S. Appl. No. 17/929,593 mailed Dec. 6, 2023, 20 pages.
Amazon Simple Storage Service—User Guide: API Version Mar. 1, 2006; copyright 2022; 1565 pages.
IBM i 7.3: Systems management Backup, Recovery, and Media Services for i; Copyright International Business Machines Corporation 1998, 2015; 492 pages.
Oracle, Database Backup and Recover Basics, 4.4-4.4.4.4, 2022, 10 pages.
IBM, Incremental backups; https://www.ibm.com/docs/en/psfa/7.2.1?topic=command-incremental-backups; last Updated: Apr. 26, 2022, copyright IBM Corporation 2015, 2016; 1 page.
Office Action in U.S. Appl. No. 17/929,593 mailed May 28, 2024, 23 pages.

* cited by examiner

| Task type | Status | Submitted at | Started at | Duration |
|---|---|---|---|---|
| Protection Group S3 Asset SecureVault Backup | Completed | 02/08/2022 7:05 pm | 02/08/2022 7:07 pm | < 1 minute |
| ... | | | | |
| Protection Group S3 Asset SecureVault Backup | Completed | 02/18/2022 7:09 pm | 02/08/2022 7:11 pm | < 1 minute |

Example Report 800

FIG. 8

Example global search interface
900

Enter criteria to search objects across buckets for selected protection group:

| Object Key Contains : Billing ▶ | Backup to Restore: Last Backup ▶ | + Filter ▶ | Preview |

| Object Key | Version ID | Type | Size | Storage Class | Etag | Bucket Name | Last Modified |
|---|---|---|---|---|---|---|---|
| ○ ../a/billing.jpg | # | JPEG | 1 MB | Glacier | - | B01 | 09/28/2021 |
| ● ../a/BILLING.PDF | # | PDF | 4 MB | Glacier | - | B02 | 09/08/2021 |
| ... | | | | | | | |
| | | | | | | | 1 - 4 of 4 objects  < > |

FIG. 9

Example initial backup statistics 1400

| Backup | Incremental Object Count | Incremental Size | Restore Object Count | Restore Size | Local Container Object Count | Local Container Size |
|---|---|---|---|---|---|---|
| B1 | 2 | 10 + 11 = 21 KB | 2 | 21 KB | 2 | 21 KB |
| B2 | 2 | 13 + 14 = 27 KB | 2 + 2 = 4 | 21 + 27 = 48 KB | 4 | 34 + 14 = 48 KB |
| B3 | 1 (-2) | 15 KB (-11 -14 = -25 KB) | 4 + 1 - 2 = 3 | 48 + 15 - 25 = 38 KB | 5 | 48 + 15 = 63 KB |

FIG. 14

| Expiring backup metadata | Next backup metadata | New metadata for next backup |
|---|---|---|
| Object entry is present | Object entry is not present | Preserve object entry |
| Object entry is not present | Object entry is present | Preserve object entry |
| Object entry is present | Object entry is marked deleted | Drop object entry and delete target object |
| Object entry is not present | Object entry is marked deleted | Preserve object entry deletion |
| Object entry is marked deleted | Object entry is not present | Preserve object entry deletion |

FIG. 15

Example updated backup statistics 1700

| Backup | Incremental Object Count | Incremental Size | Restore Object Count | Restore Size | Local Container Object Count | Local Container Size |
|---|---|---|---|---|---|---|
| B1 | 2 | 10 + 11 = 21 KB | 2 | 21 KB | 2 | 21 KB |
| B3' | 2 (-1) | 13 + 15 = 28 KB (-11 KB) | 2 + 2 - 1 = 3 | 21 + 28 - 11 = 38 KB | 3 | 21 + 28 = 49 KB |

FIG. 17

Example Backup using re-seeding 2010

| Backup | Inventory | New objects in backup | All objects in backup |
|---|---|---|---|
| 1 (seeding) | A, B | A (missed B due to bug) | A |
| 2 (incremental) | A, B, C | {A, B, C} – {A, B} = C | A, C |
| 3 (re-seeding) | A, B, C | A, B, C | A, B, C |
| 4 (incremental) | A, B, C, D | {A, B, C, D} – {A, B, C} = D | A, B, C, D |

FIG. 20A

Example Backup using independent incremental 2020

| Backup | Inventory | New objects in backup | All objects in backup |
|---|---|---|---|
| 1 (seeding) | A, B | A (missed B due to bug) | A |
| 2 (incremental) | A, B, C | {A, B, C} – {A, B} = C | A, C |
| 3 (Independent incremental) | A, B, C | {A, B, C} – {A, C} = B | A, B, C |
| 4 (incremental) | A, B, C, D | {A, B, C, D} – {A, B, C} = D | A, B, C, D |

FIG. 20B

PROTECTION GROUPS FOR BACKING UP CLOUD-BASED KEY-VALUE STORES

This application is related to U.S. application Ser. No. 17/929,593, filed Sep. 2, 2022, the disclosure of which is incorporated by reference herein in its entirety.

The present application claims priority to U.S. Provisional App. No. 63/362,439, entitled "Protection groups and change data capture for backups," filed Apr. 4, 2022, the disclosure of which is incorporated by reference herein in its entirety.

BACKGROUND

Technical Field

This disclosure relates generally to data backups and more particularly to backup and recovery of data in a cloud storage environment.

Description of the Related Art

Backup and archiving of data in computing systems is important in various contexts, e.g., to mitigate or prevent data loss due to equipment failure or malicious activity. Many data stores are now cloud based, e.g., Amazon Web Services S3 storage, Microsoft Azure, IBM cloud databases, etc. Cloud-based systems may allow entities to store substantial amounts of data without maintaining the storage hardware. Providing backups in the cloud-based context may be challenging in terms of security, ransomware protection, compute resources, cost, etc.

Some data stores are structured while others are unstructured, each of which may have various advantages and drawbacks. A key-value database is one type of a non-relational database that stores data as a collection of key-value pairs, where a key is used as a unique identifier to retrieve associated value with each key. The keys and values may be, for example: strings, numbers, complex objects, etc. Amazon simple storage service (S3), for example, is a cloud-based key-value data store, for storing diverse and mostly unstructured data. S3 buckets are containers that store uploaded objects.

Backup storage services are typically utilized to protect various types of information from being lost due to hardware failure, file corruption, malicious entities, natural disasters, etc. It may be desirable to backup cloud-based data and potentially to use cloud-based solutions for the backup storage. Generally, backups may be challenging in terms of differentiating between types of data, time-constraints, data size and cost, querying backups, restoration, etc. In addition, cloud-based backup services may face challenges of object versioning overhead, costs for small files, etc.

BRIEF DESCRIPTION OF THE DRAWINGS

FIG. 8 is a diagram illustrating an example report for a protection group, according to some embodiments.

FIG. 9 is a diagram illustrating an example global search interface, according to some embodiments.

FIG. 14 is a diagram illustrating example initial backup statistics corresponding to the situation of FIG. 13, according to some embodiments.

FIG. 15 is a diagram illustrating example actions in different garbage collection scenarios, according to some embodiments.

FIG. 17 is a diagram illustrating example updated backup statistics after the merge, according to some embodiments.

FIG. 20A is a block diagram illustrating an example re-seeding backup, according to some embodiments.

FIG. 20B is a block diagram illustrating an example independent incremental backup, according to some embodiments.

DETAILED DESCRIPTION

Figure 1:
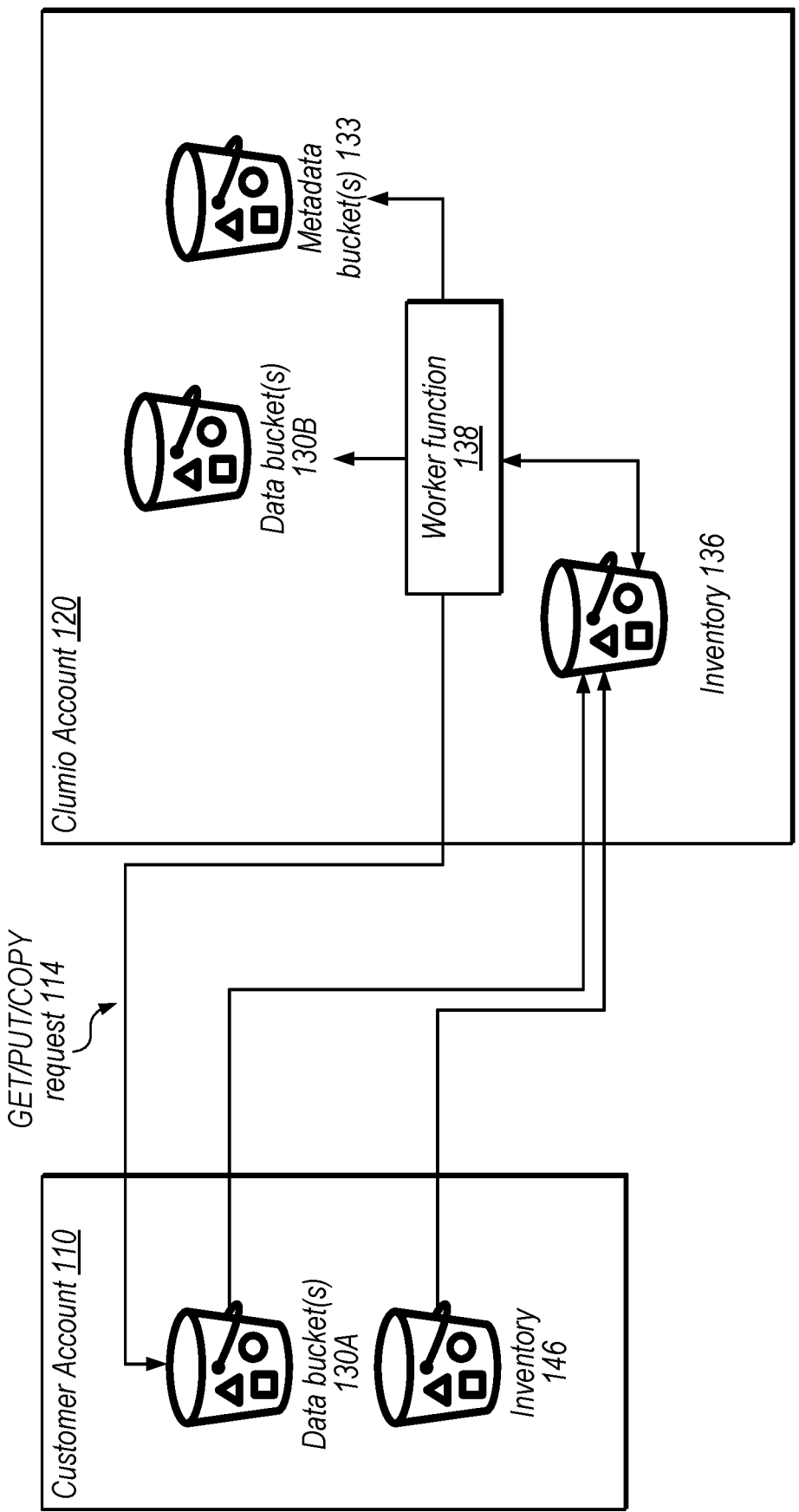
FIG. 1 is a block diagram illustrating an example backup service, according to some embodiments.

Identifying data for backup and performing time-effective and cost-effective backups is important in various contexts. In some embodiments, cloud-based key/value buckets are used to store backup data. The backups may be incremental at object granularity, which may be referred to as change data capture (CDC). In this context, a given backup may store only objects that are new or have been modified or deleted since the previous incremental backup. Incremental backups may reduce backup data costs while object-level incremental may allow fine-grained restoration, queries, etc. In the incremental context, restoration of a given backup may involve accessing metadata for both the backup to be restored and metadata for previous backups, in order to determine the full set of objects to be restored.

Protection group techniques discussed in detail below may be used to configure what data is backed up from among multiple key-value stores (e.g., Amazon S3 buckets) and how the backup data is stored using incremental backups. Protection groups may specify filters for which data to backup and policies for how that data is to be backed up. For example, a protection group may have filter parameters such as object prefixes, storage classes, and versions to be included in a backup. Policy parameters may include backup time, frequency, target storage class, etc.

Protection groups may advantageously provide a centralized view across buckets, accounts, and regions and allow users to target specific subsets of their data stores for backup, which may improve performance and reduce backup storage costs. This may avoid users needing to separately search multiple buckets, e.g., if it is not known which bucket stores an object to be restored. As used herein, the term "bucket" refers to a key value container structure, where keys for objects in a given bucket are unique (although keys may be re-used among different buckets).

The backup service may provide global searches across multiple buckets in a protection group. Global search may also be used for targeted restoration of backup data from a protection group (potentially including data from multiple buckets in the protection group) in contrast with traditional techniques which might restore an entire backup image to retrieve specific objects from a given backup.

The backup service may provide garbage collection services to delete data that no longer needs to be backed up, such as data from expired backups according to an expiration policy for a protection group or data from manually-deleted backups. The backup service may implement fast metering to quickly determine space freed up in the context of incremental backups, even before actual garbage collection occurs. This may decouple metering tasks from background garbage collection tasks.

In various contexts, performing object-level incremental backups may mitigate the time-intensive and space-intensive nature of performing a traditional data backup (e.g., a backup of an entire image). In some embodiments, the backup service may generate object-level differentials between inventories and may merge multiple differentials to determine data for a given backup. In some embodiments, the backup service may pack multiple small objects into a packed object, with a key for the packed object and metadata indicating the packing, for backup. The backup service may also compress packed objects, in some embodiments.

Further, data restoration from a backup is traditionally a time and compute-intensive process. Disclosed restoration management techniques may advantageously leverage parallelization and protection group mechanisms to restore single buckets, multiple buckets, single objects, multiple objects, objects and buckets that match specific search criteria, etc. In some embodiments, leveraging parallelization, e.g., using cloud worker modules to process chunks of data in parallel, may enable entities to restore important data in a time-sensitive and affordable manner.

In some embodiments, separate accounts and encryption may provide an air gap for a protection group that protects against events like ransomware attacks, inadvertent deletion/ modification of data, etc. For example, disclosed techniques may be used in combination with techniques discussed in U.S. patent application Ser. No. 17/649,699, filed Feb. 2, 2022, which is incorporated by reference herein in its entirety.

Figure 2:
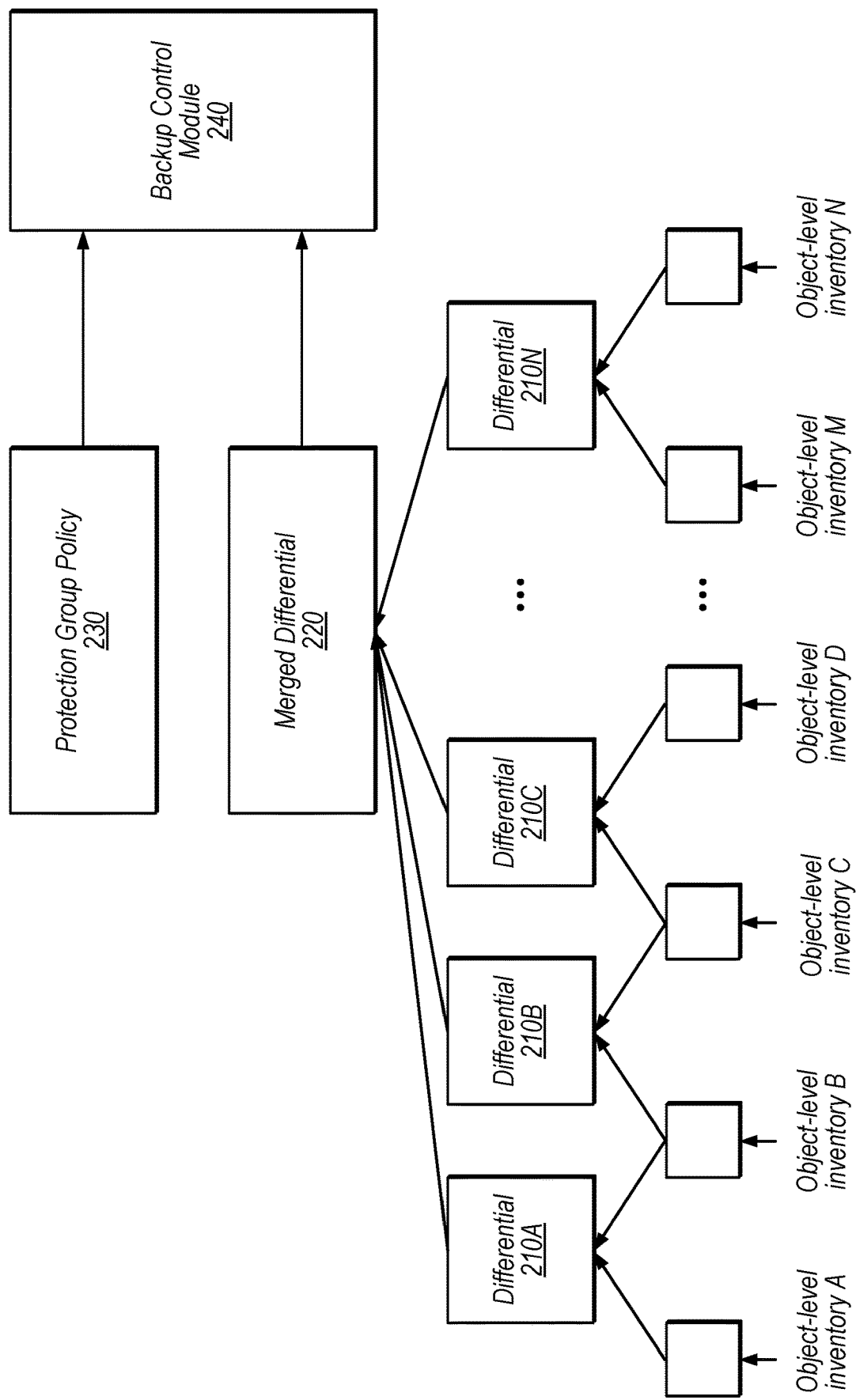
FIG. 2 is a block diagram illustrating an example temporal merged object-level differential, according to some embodiments.

The following discussion describes the concept of cloud-based backups with reference to FIG. 1 while FIG. 2 provides an overview of incremental backups. FIGS. 3-10 relate to protection group techniques in the incremental backup context. FIGS. 11-17 relate to garbage collection and metering. FIGS. 18-22 relate to handling carry-over work for incremental backups, representing incremental information, and restoration using parallel processing.

Overview of Example Backup Service in S3 Context

FIG. 1 is a block diagram illustrating an example backup service, according to some embodiments. In the illustrated embodiment, the backup service is a Clumio service that uses Clumio account 120 to backup data for customer account 110. Customer account 110 has corresponding data bucket(s) 130A and inventory 146. Clumio account 120 has corresponding data bucket(s) 130B, metadata bucket(s) 133, inventory 136, and worker function 138 (e.g., an AWS lambda function).

In the illustrated embodiment, customer account 110 is an account of a cloud-based storage service (e.g., a cloud key-value store) such as Amazon S3, for example. Data objects associated with customer account 110 are stored in data bucket(s) 130A. Inventory 146 may be a list of all objects associated with customer account 110.

Multiple versions of an object may be stored in a given bucket and may be assigned a new version ID every time the object is overwritten. Bucket, key, and version ID may be used to identify a given object uniquely. S3 may have different storage classes to store buckets for different use cases and expected volumes, for example, S3 standard, S3 standard—IA, S3 one Zone—IA, etc. These storage classes may be set at the object level or may be selected as a default storage class for objects that are created at the bucket level. Amazon S3 may work with a console or a web-service interface to access raw objects or buckets.

In the illustrated embodiment, Clumio account 120 is an account associated with a customer (e.g., the customer that also owns customer account 110). Clumio account 120 may be an account on the same cloud-based storage service as customer account 110, a different cloud-based storage service, or a non-cloud-based storage system. In some embodiments, air gap techniques are utilized between accounts 110 and 120, e.g., using different encryption keys to encrypt data in the different accounts. In some embodiments, control modules that operate Clumio account 120 (e.g., to request inventories, object retrieval, object storage, worker functions, etc.) operate on one or more servers that are separate from the cloud-based service hosting Clumio account 120. In other embodiments, various control modules discussed herein may be implemented by worker functions of the cloud service.

In some embodiments, data bucket(s) 130B store a backup of the data objects in data bucket(s) 130A that are associated with one or more customer accounts 110. In some embodiments, metadata bucket(s) 133 stores metadata associated with objects stored in data bucket(s) 130B, which may be generated as part of a backup operation.

In some embodiments, any number of items of metadata may be included in metadata bucket(s) 133, including but not limited to a container ID, backup time, backup ID, source bucket, source key, source version, target bucket, target key, header offset, data offset, last modified time, size, Etag, storage class, tags, is latest, is deleted, is delete marker, backup tier, stack ID, etc. These example types of metadata are briefly discussed below.

In some embodiments, container ID metadata indicates a particular protection group a data object is associated with. In some embodiments, backup time metadata provides the time (e.g., epoch) of backup for a particular object stored in data bucket(s) 130B. In some embodiments, backup ID metadata indicates the particular backup in which a data object was stored.

In some embodiments, source bucket metadata identifies the Amazon S3 bucket a data object is associated with. In some embodiments, source key metadata identifies a unique key associated with an object. In some embodiments, a particular object has a unique key, but may have multiple different versions. In some embodiments, source version metadata indicates a version number for an object.

In some embodiments, target bucket metadata indicates the backup bucket associated with an object. In some embodiments, target key metadata indicates the backup key associated with an object.

In some embodiments, header offset metadata refers to the offset within a packed object where metadata associated with the object is stored (where a packed object may include multiple backed-up objects). In some embodiments, data offset metadata refers to the offset within a packed target object where the data for the object is stored.

In some embodiments, last modified time metadata provides the time (e.g., epoch) of when an object was last modified. In some embodiments, the last modified time for an object may be larger or smaller than the backup time associated with the object. In some embodiments, size metadata provides the size of an object. In some embodiments, Etag metadata reflects changes to the contents of an object.

In some embodiments, storage class metadata provides the storage class (e.g., S3 standard, S3 one Zone—IA, S3 standard—IA, etc.) associated with an object before backup. In some embodiments, tags metadata provides the custom tags specified for objects, as discussed in detail with respect to FIG. 10 above. In some embodiments, backup tier metadata indicates a backup tier (e.g., cold, warm, frozen, etc.) associated with an object, where the backup tier indicates a level of redundancy, cost, and accessibility (e.g., access time), for example.

In some embodiments, is latest metadata indicates whether an object is the latest version of the object. In some embodiments, is latest metadata is provided in a binary format (e.g., indicated by 1 or 0) or similar (e.g., True, False, etc.). In some embodiments, is deleted metadata indicates when an object has been deleted. In some embodiments, is deleted metadata is provided in a binary format (e.g., indicated by 1 or 0) or similar (e.g., True, False, etc.). In some embodiments, is delete marker metadata indicates whether a particular versioned object was named in a delete request. For example, the object may not be deleted, but when the is delete marker is asserted Amazon S3 may behave as if the object is deleted.

In some embodiments, stack ID metadata indicates a stack associated with an object, e.g., which may be rebuilt for restoration using parallel data chunking. In some embodiments, metadata bucket(s) 133 includes metadata of both live objects and expired objects. In some embodiments, the structure of metadata of live objects may be different from the structure of metadata of expired objects, and the metadata of live objects may be stored in a separate partition (e.g., a separate table) of metadata bucket(s) 133 than the metadata of expired objects. Note that various disclosed metadata may be stored in a structured database and may be queried based on values of various disclosed metadata fields.

In some embodiments, inventory 136 is a copy of inventory 146 associated with customer account 110. Speaking generally, Clumio account 120 may use snapshots (e.g., inventories of customer accounts at different times) for incremental backups. Therefore, the data of data bucket(s) 130B may include multiple versions of a given object from data bucket(s) 130A, in certain scenarios.

In some embodiments, worker function 138 may be used to retrieve one or more objects from an inventory. In some embodiments, worker function 138 may modify the requested one or more objects based on parameters provided by a requesting client or an application. In some embodiments, worker function 138 may issue GET/PUT/COPY requests 114 and retrieve objects based on the request(s) 114.

Note that FIG. 1 depicts one example embodiment of a backup service, and in other embodiments the backup service may not perform a cloud backup or have an account on the same cloud service (e.g., Amazon S3). FIG. 1 is discussed in the context of Amazon S3 for purposes of illustration.

Overview of Object-Level Incremental Backups

FIG. 2 is a block diagram illustrating an example temporal merged object-level differential, according to some embodiments. In the illustrated embodiment, the backup service generates object-level inventories A-N at different times. The backup service generates differentials 210A-210N and merged differential 220 based on these inventories. The backup service uses backup control module 240 to control backups based on the merged differential 220 and a protection group policy 230, in this embodiment.

As shown, in some embodiments the backup service compares consecutive object-level inventories A-N to generate differentials 210A-210N. For example, object-level inventory A and object-level inventory B may be compared to generate differential 210A, which represents the differences between the two object-level inventories (e.g., which reflects added objects, amended objects, deleted objects, etc.).

In some embodiments, object-level inventories A-N may include a list of all objects currently specified in one or more Amazon S3 buckets.

In some embodiments, differentials 210A-210N reflect all changes between two successive inventories (e.g., inventories A and B, or B and C, etc.). As shown, the backup service merges the differentials 210 (e.g., using a temporal merge) to generate merged differential 220. In some embodiments, a temporal merge captures the latest changes that occur to one or more objects in differentials 210 and may not reflect intermediate changes that occur (e.g., when an object is changed multiple times in the time interval corresponding to the overall merge). In other embodiments, a different type of merge is used that captures all changes that occur to one or more objects in differential 210.

In the illustrated embodiment, protection group policy 230 may specify various types of information about the protection group (e.g., the buckets in the protection group, filters for objects in the protection group, backup frequency, etc.).

In the illustrated embodiment, backup control module 240 receives, as inputs, merged differential 220 and protection group policy 230. In some embodiments, protection group policy 230 is applied to merged differential 220 to generate a net differential. In some embodiments, backup control module 240 may perform a backup based on the net differential. Therefore, a given backup may include data that has changed or been added since the last backup, but may not include data that has already been backed up. The object-level inventories and differentials may be particularly efficient in situations where objects vary substantially in size.

Overview of Protection Groups

Figure 3:
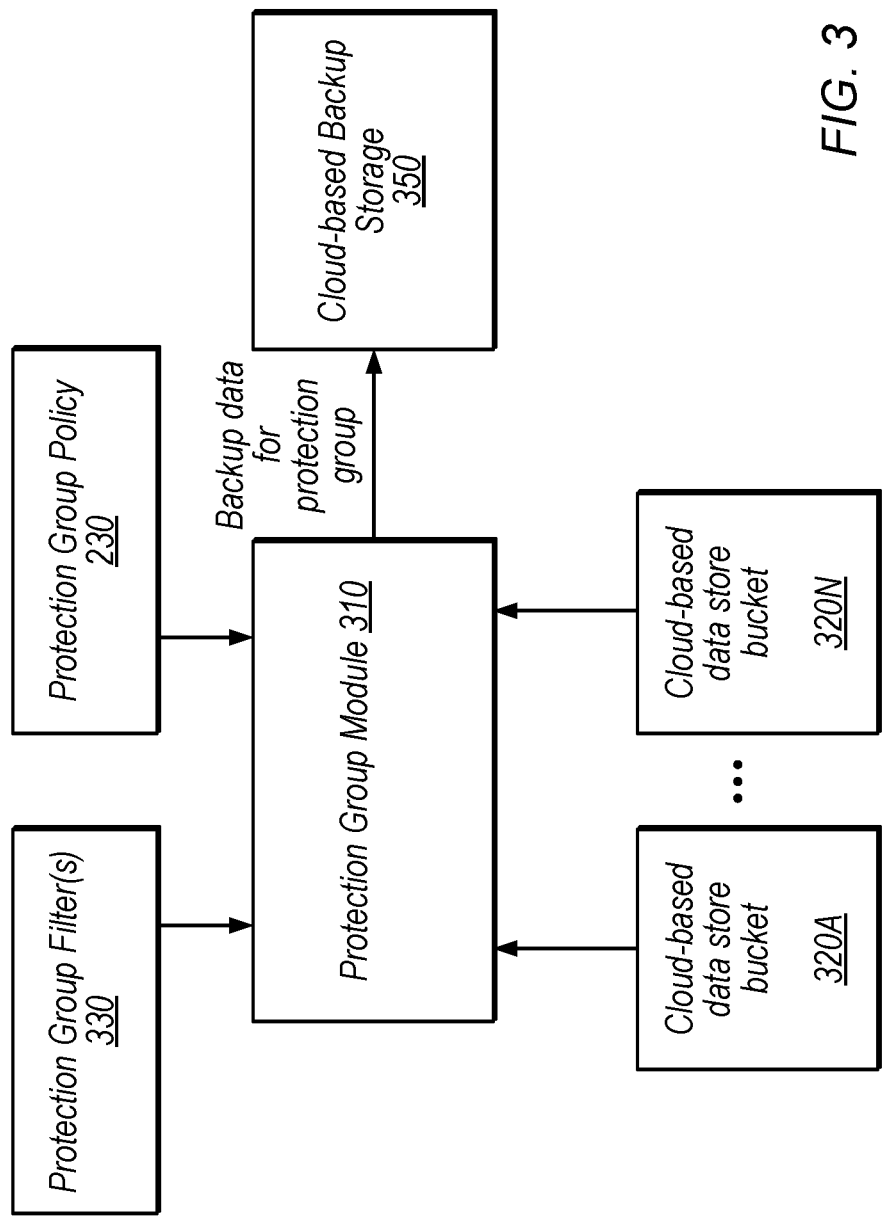
FIG. 3 is a block diagram illustrating an example protection group module, according to some embodiments.

FIG. 3 is a block diagram illustrating an example protection group module, according to some embodiments. In the illustrated example, protection group module 310 receives input from various sources, including protection group filter(s) 330, protection group policy 230, and multiple cloud-based data store buckets 320A-320N. Protection group module 310 provides backup data for a protection group to cloud-based backup storage 350. In other embodiments, protection group module 310 may output control signaling associated with backups by another module.

Cloud-based data store bucket(s) 320, in some embodiments, are containers for objects stored in cloud-based key value stores. Buckets 320 may store any number of objects but, in some embodiments, there may be a limit on the object storage per bucket. Amazon S3, as one example, may allow users to store any number of objects in a bucket and a given user may be allowed up to 100 buckets in their account. A given bucket 320 may have a globally unique name and users may be recommended to choose corresponding regions geographically close to them in order to reduce latency and further costs. Users may also select a tier for their data, where different tiers have different levels of redundancy, prices, and accessibility, for example. Buckets 320 may store objects from different S3 storage tiers.

Protection group module 310, in the illustrated embodiment, backs up data from one or more buckets 320 according to protection group filter(s) 330 and stores the data for the protection group in cloud-based backup storage 350 according to protection group policy 230.

Cloud-based backup storage 350 may use similar buckets to buckets 320 (both the original data and the backup may be stored using S3 buckets, e.g., of different accounts) or may use a different storage format.

Figure 4:
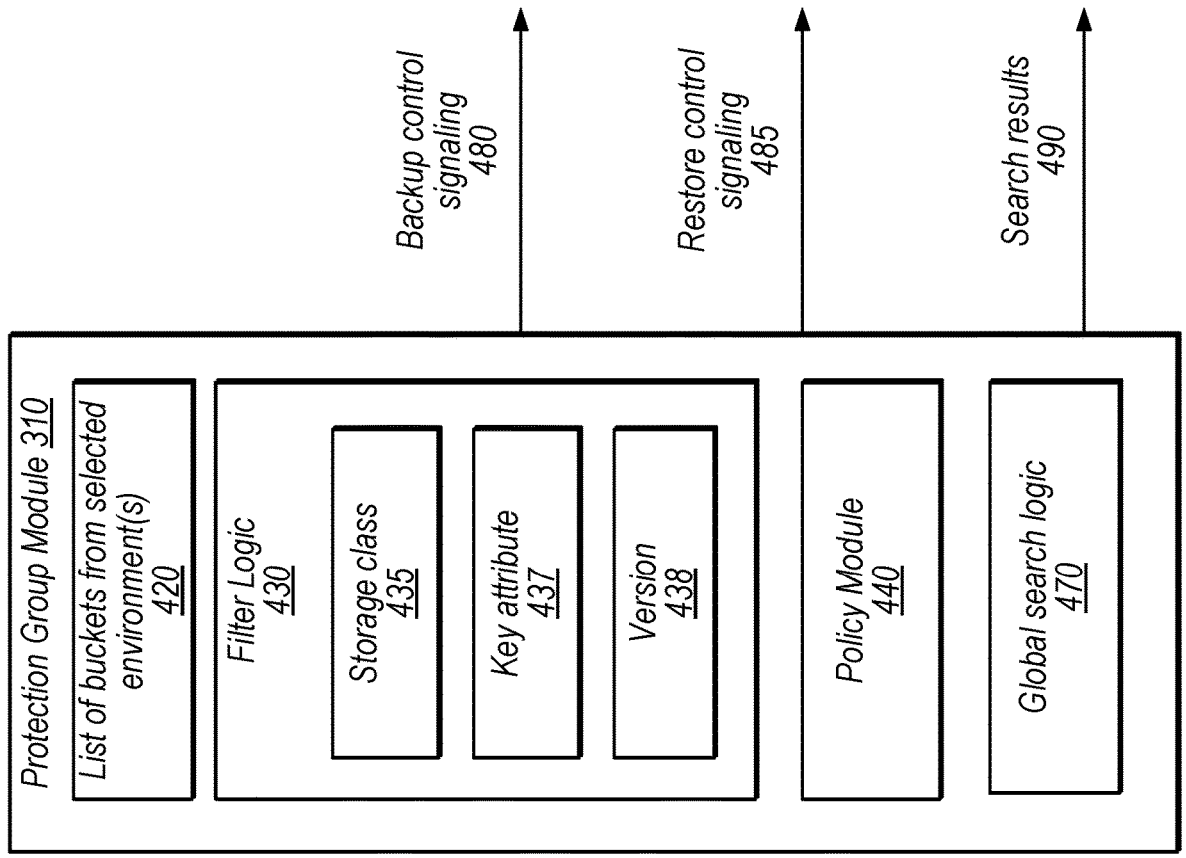
FIG. 4 is a block diagram illustrating a detailed example protection group module, according to some embodiments.

FIG. 4 is a block diagram illustrating a detailed example protection group module, according to some embodiments. In the illustrated example, module 310 includes a list of buckets from one or more selected environment(s) 420, filter logic 430, policy module 440, and global search logic 470. In the illustrated example, module 310 outputs backup control signaling 480, restore control signaling 485, and search results 490.

List 420 may be user-provided and indicates one or more buckets from one or more environments from which data is to be backed up. This may allow users to differentiate between critical and non-critical data, for example, and protect the critical data without performance and cost issues relating to backing up an entire dataset. Note that a given organization may create an environment or multiple environments in a cloud storage service. Different environments may have different configurations of environment variables, for example. In some embodiments, keys are unique within an environment, as well as being unique within a given bucket. A protection group may include buckets from one or more environments, in some embodiments.

In some embodiments, a bucket view interface (not shown) may allow a user to view a list of buckets in a given environment. This interface may indicate bucket names, number of objects in each bucket, size of data in a given bucket, creation date, tag information, etc. In some embodiments, this interface may indicate any protection groups associated with a given bucket.

Filter logic 430, in the illustrated embodiment, includes storage class parameter 435, key attribute parameter 437, and version parameter 438. While these filter parameters are included for purposes of illustration, they are not intended to limit the scope of the present disclosure; other filter parameters may be included. The storage class may indicate to backup only certain storage classes from the list of buckets. The key attribute may indicate to backup only objects that have keys with certain parameters, e.g., a prefix value or postfix value as discussed in detail below. In other embodiments, any of various pattern matching or other key filter attributes may be specified. In still other embodiments, other object parameters that are not key-related may be specified, e.g., based on the size of objects. The version parameters may indicate which versions to backup, e.g., the latest version, all versions, some subset of versions, etc.

Policy module 440, in some embodiments, is configured to implement a backup policy. The backup policy may indicate backup frequency, backup time, retention parameters, and target storage tier, for example. Backup frequency may indicate to backup daily, every N days, every M weeks, etc. The backup time may be scheduled for a time when the data is accessed least, e.g., to reduce the number of changes to the data set that occur near the backup event. The retention parameters may indicate how long to store the backup before expiring/deleting the backup data. Different target storage tiers may provide tradeoffs, e.g., in terms of performance (e.g., read access time) and cost. Users may select a target storage tier for backup data that meets their needs.

Global search logic 470 may allow queries across multiple buckets in a protection group. Note that the query may be performed based on metadata associated with the original data (e.g., key information, bucket information, environment information, etc.), additional metadata generated by the backup service when generating incremental backups, or both. The backup service may generate various metadata for a backup such as backup version, timestamp information, protection group information, object-level information, compression information, packing information, etc.

Example search criteria may include, without limitation: key, backup version, object version, object type, object size, object hash information, and bucket identifier. Key criteria may include all or a portion of keys to search. Backup version criteria may indicate to restore a specific version, all versions, or a range of versions, for example. Object version may indicate a specific version, all versions, or a range of versions of an object, for example. Object type criteria may indicate various aspects of an object, e.g., file type, original storage class, etc. An S3 ETag is one example of object hash information that reflects changes to the contents of an object. The bucket identifier may identify one or more buckets in the original data store for which matching objects are to be returned (these buckets may or may not correspond to buckets used to store backup data). Global search for a protection group may allow restoration of specific desired data from one or more backups. Protection group module 310 may provide search results 490 based on queries controlled by global search logic 470.

FIGS. 5-10, discussed in the following section, provide example interfaces for configuring a protection group, performing global search, and restoring backup data, according to some embodiments.

Example Protection Group Configuration

Figure 5:
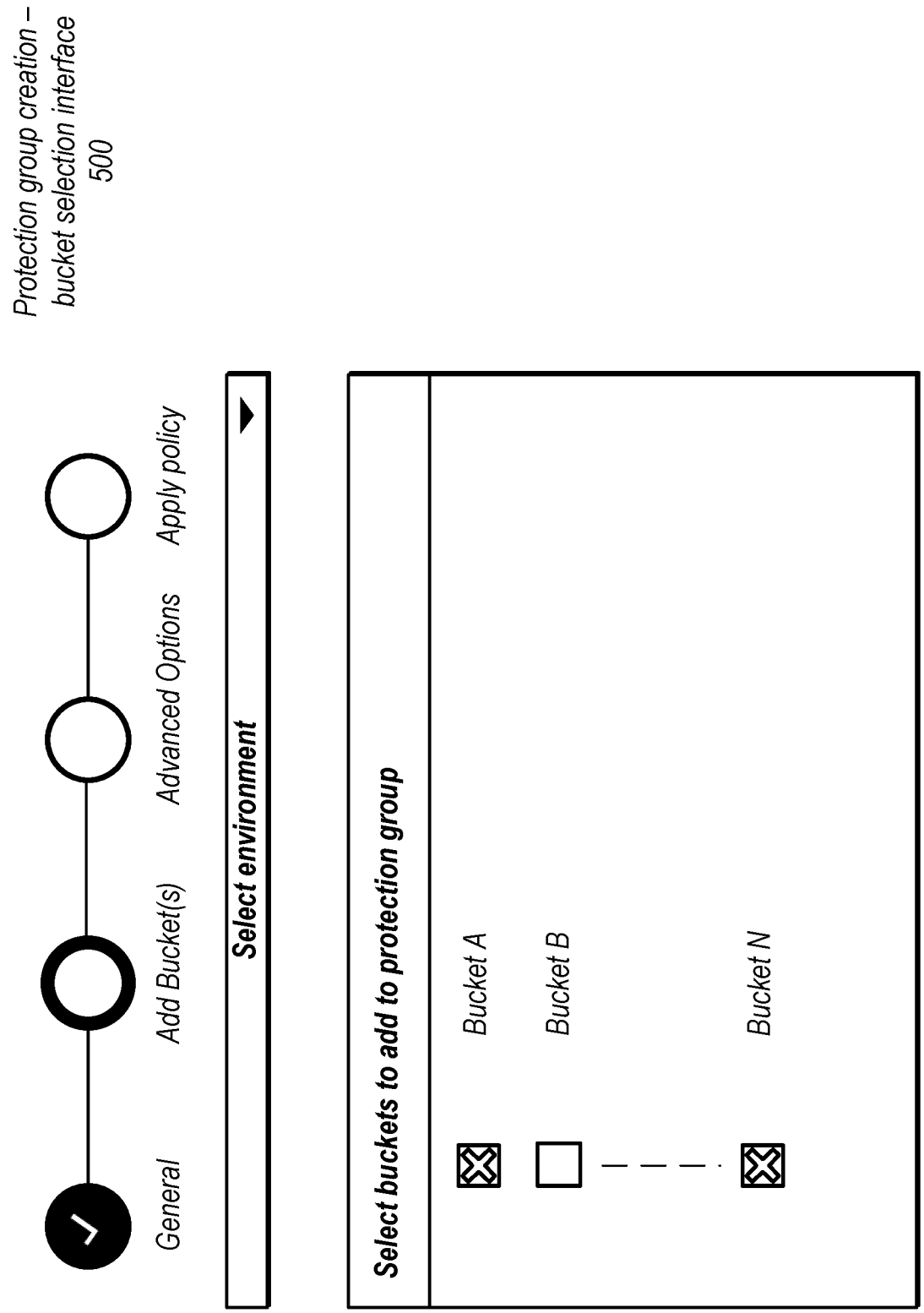
FIG. 5 is a diagram illustrating example bucket selection for a protection group, according to some embodiments.

FIG. 5 is a diagram illustrating example bucket selection for a protection group, according to some embodiments. In various embodiments, protection groups may provide an abstract layer to manage buckets and a mechanism to classify data across buckets, potentially from multiple different accounts. As shown, bucket selection interface 500 allows a user to select one or more environments and select buckets from those environment(s) to add to the protection group. Buckets that are not added to the protection group may not be backed up (unless they are assigned to another protection group).

In some embodiments, buckets may be automatically added to a protection group, e.g., based on user-specified tag information and backup service logic that adds buckets that match the tag information.

Figure 6:
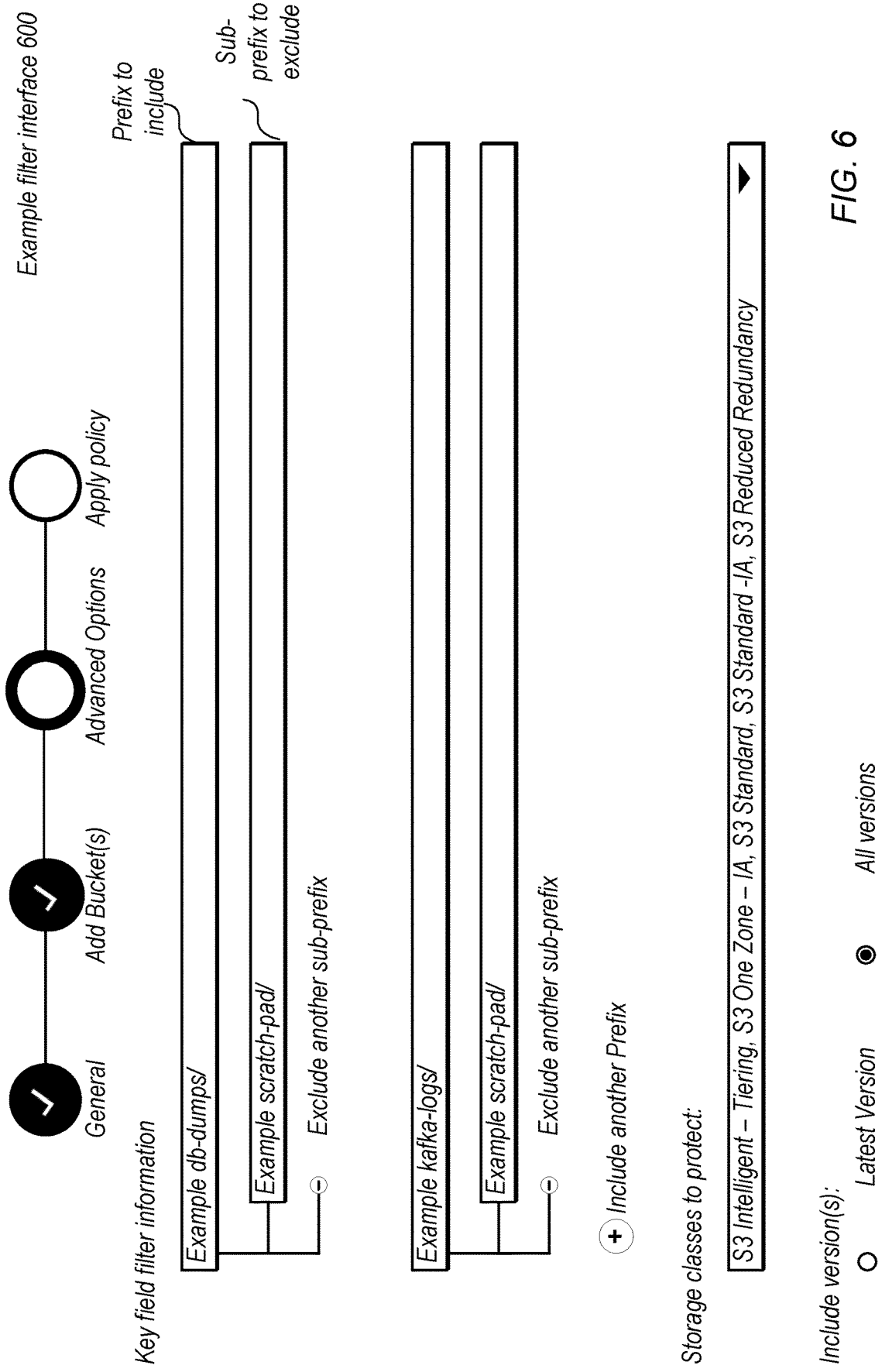
FIG. 6 is a diagram illustrating example filter configuration for a protection group, according to some embodiments.

FIG. 6 is a diagram illustrating example filter configuration for a protection group, according to some embodiments. Generally, filter information may specify a subset of bucket contents to be backed up. In the illustrated example, the interface receives key field filter information that specifies key prefixes for which objects are to be backed up (e.g., the db-dumps prefix and the kafka-logs prefix) and sub-prefixes within those prefixes to exclude (e.g., the scratch-pad sub-prefix). The prefixes may correspond to folders and sub-folders in some data stores. The interface also includes an element that is selectable to add additional prefixes. As discussed above, various key field filter parameters may be specified in various embodiments.

In the illustrated example, interface 600 also includes a drop-down menu for storage classes to be protected. Objects in other storage classes may not be backed up.

In the illustrated example, interface 600 also provides radio buttons to select either the latest version or all versions of an object for backup. In other embodiments, additional version customization may be provided. Backing up prior versions may allow data to be restored when an object is unintentionally updated, for example.

Figure 7:
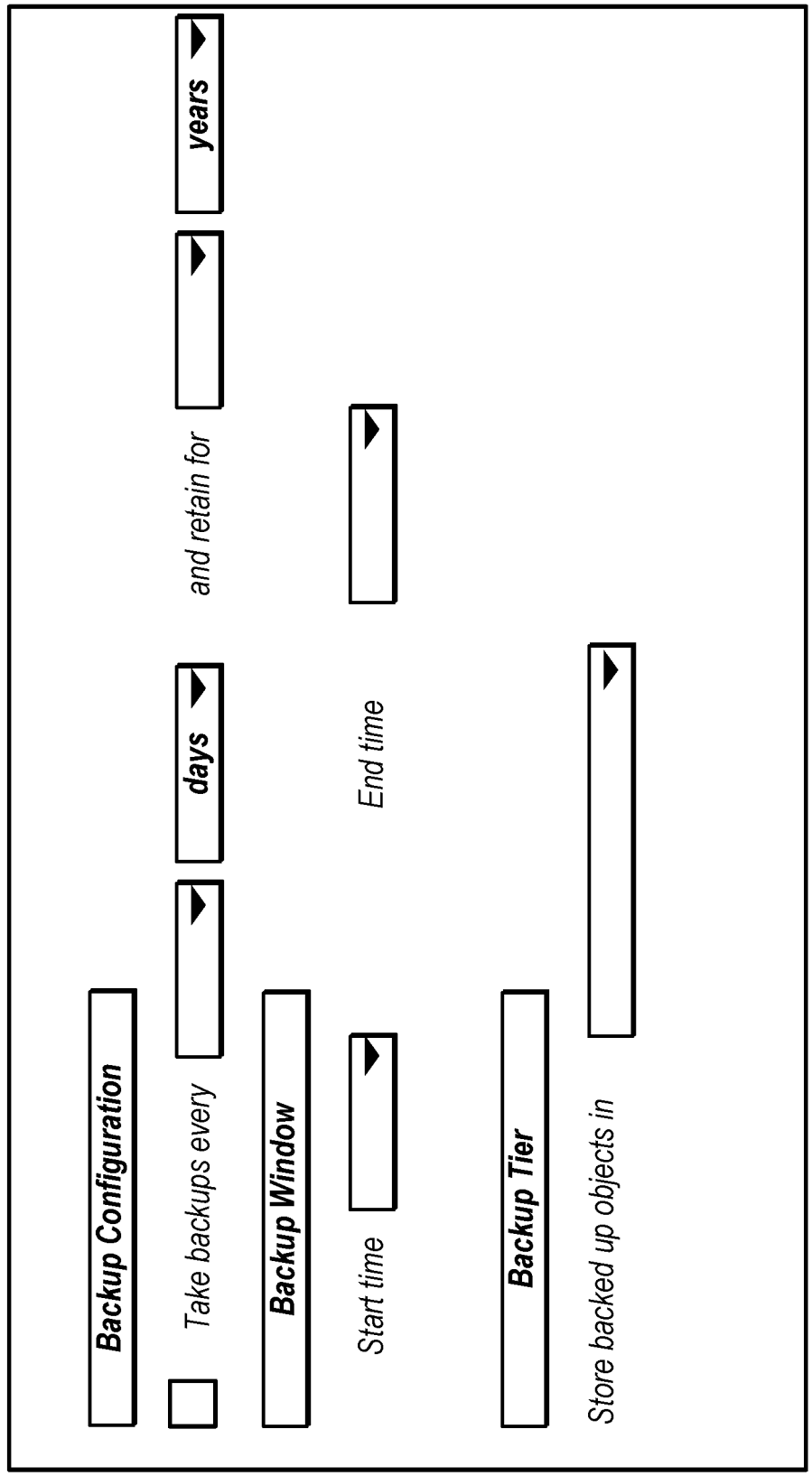
FIG. 7 is a diagram illustrating example policy configuration for a protection group, according to some embodiments.

FIG. 7 is a diagram illustrating example policy configuration for a protection group, according to some embodiments. As shown, interface 700 includes drop-down menus that allow a user to configure backup frequency, backup retention, backup window, and backup storage tier. In some embodiments, the backup service may allow users to select a policy from a list of template policies or previously-configured policies.

FIG. 8 is a diagram illustrating an example report for a protection group, according to some embodiments. The example report shows a task type (backup in this example), status (e.g., complete, in progress, failed, etc.) submission and start times for the task, and duration of the task. Such reports may allow administrators to check the status of tasks for various protection groups.

FIG. 9 is a diagram illustrating an example global search interface, according to some embodiments. In the illustrated example, interface 900 includes multiple example criteria for searching across buckets for a selected protection group. In this example, one criterion is that the object key contains the term "Billing." Another criterion is that the last backup is searched, and no other backups. Various additional filters may also be selected via a drop-down menu. The preview element may allow an initial query to be performed to show matching objects. As shown, the user may use radio buttons to select one or more objects to be restored, which may lead to the interface of FIG. 10, discussed in detail below.

Global search may provide substantial performance advantages and convenience for users, relative to querying cloud-based buckets separately, for example. A user may query for a specific folder, for example, to find out when it was last backed up, even if they do not remember what bucket that folder is stored in. Further, specific search criteria may allow restoration at the object level instead of restoring an entire bucket.

Figure 10:
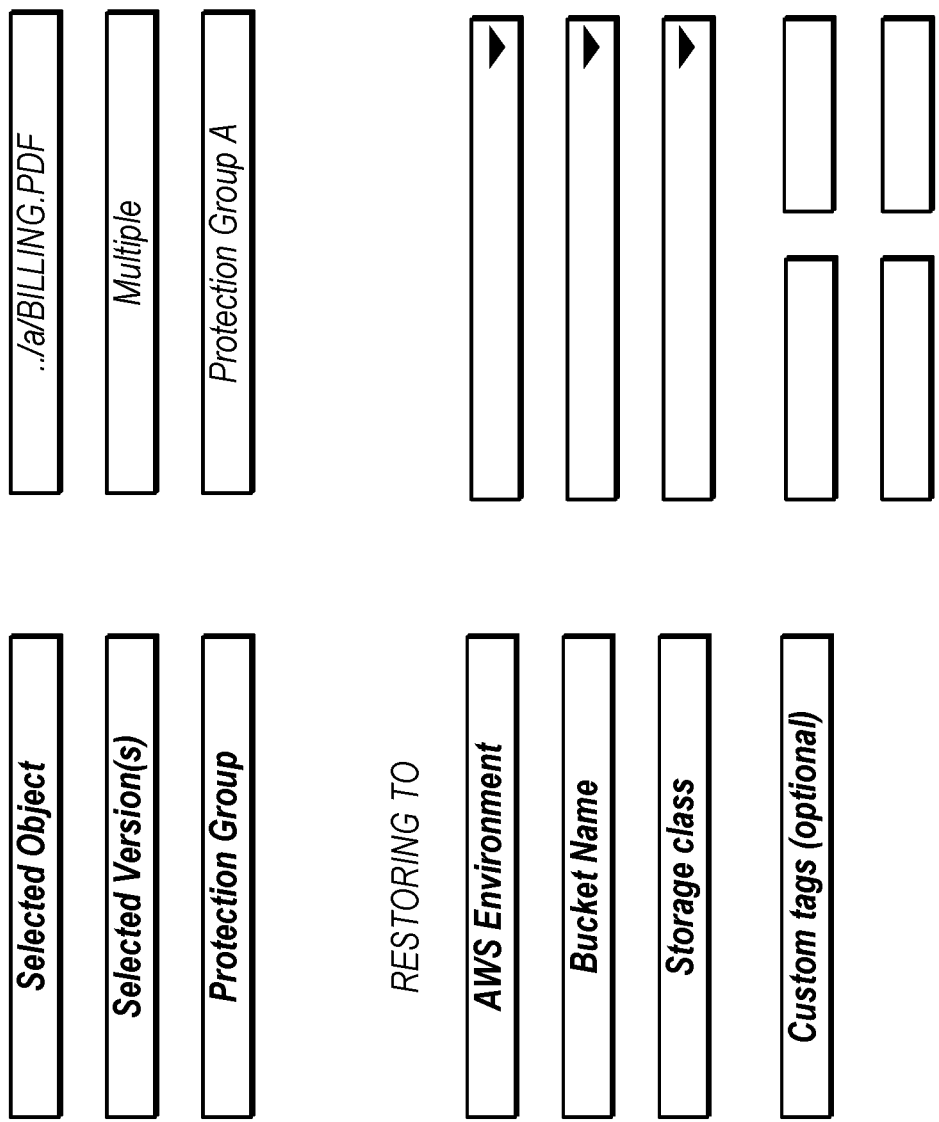
FIG. 10 is a diagram illustrating an example object restoration interface, according to some embodiments.

FIG. 10 is a diagram illustrating an example object restoration interface, according to some embodiments. In the illustrated example, interface 1000 includes an identification of a select object (or set of objects), in this case "billing.pdf." As shown, the interface supports selection of a single version or multiple versions and identifies the protection group associated with the object.

As shown, the interface further permits configuration of the environment (AWS environment in this example) to which data should be restored, the bucket for restoration, the storage class for restored data, and custom tags for stored data.

In the context of incremental backups, restoration may involve querying metadata for the backup being restored. Note that this backup may have incrementally backed up only objects that changed during the last backup, so a restoration query may actually query metadata for multiple incremental backups to determine a set of objects corresponding to a given backup time. Thus, a restoral may include objects that were backed up as part of multiple different incremental backups.

The backup service may store metadata for incremental backups in a structured database (e.g., an Athena database) which may be separate from the storage of backed up objects. This metadata may include both metadata from the original data store and metadata generated by the backup service for backups. The backup service may query this metadata to determine which objects to restore when restoring a backup or a set of backups (e.g., to check for all objects that meet one or more restoration criteria that are listed in metadata for backups, including the backup being restored and any relevant older backups).

Further, a restoral may restore the latest version of objects corresponding to a backup time or may restore multiple versions of given objects, in some scenarios, which also may involve retrieving objects associated with different incremental backups.

Example Metering Techniques

In some embodiments, the backup service may provide fast metering, e.g., to adjust client backup space statistics quickly after backups expire. In some embodiments, the metering calculation may be performed even before garbage collection occurs to delete expired data.

Figure 11:
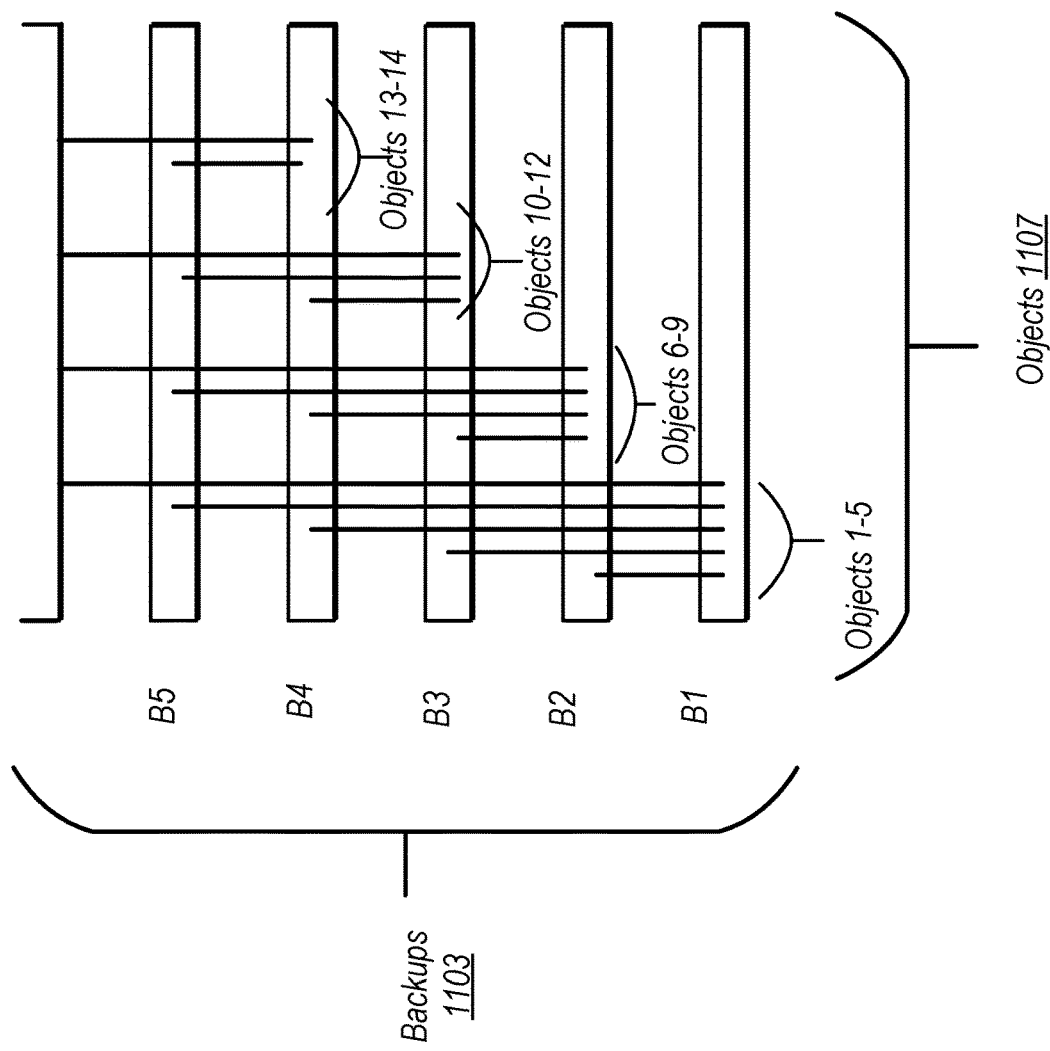
FIG. 11 is a diagram illustrating an example set of incremental backups and object creation/deletion, according to some embodiments.

FIG. 11 is a diagram illustrating an example set of incremental backups and object creation/deletion, according to some embodiments. As shown, a set of example objects 1107 (objects 1-14) are backed up using multiple incremental backups 1103 (B1-B5).

In this example, B1 is the oldest backup and B5 is the most recent backup. Each object may have a unique identifier and the vertical bars indicate the lifetime of an object. For example, a given object is created at some point in time and first reflected in the next backup. The object then persists or is eventually deleted and should not be reflected in the subsequent backup. In this example, object 6 is created between backups B1 and B2 and is deleted before backup B3 (although backup B3 may include a reference to object 6 to indicate its deletion). In some embodiments, a given object may be referenced twice, e.g., in the backup that occurs after it is created and also referenced in the backup that occurs after it is deleted (e.g., using an "IsDeleted" metadata flag).

Objects 5, 9, 12, and 14 in the illustrated example have persisted beyond the illustrated backups without deletion. Backup B1 may be a seeding backup, which refers to the first backup of a data set in the incremental context, which may be followed by a number of incremental backups.

Consider a situation where one of the backups is expired. In the incremental backup context, it may be challenging to determine which objects can now be deleted from which backups. In some embodiments, there are four cases for an expiring backup. As a first case, the previous and next backups relative to the expiring backup are still alive. As a second case, the previous backup to an expiring backup has already expired, but the next backup is still alive. As a third case, the previous backups are still alive but the next backup is expired. As a fourth case, both the previous and next backups have already expired.

The following discussion provides examples of object deletion for these four cases. Consider an example of the first case in which B3 is being expired and B2 and B4 are still alive. In this scenario, object 10 can be deleted from the backup and other objects should not be deleted. Similarly, if B2 is being expired and B1 and B3 are not expired, the space for object 6 can be reclaimed.

Consider an example of the second case in which B3 is being expired, B2 is already expired, and B4 is still alive. In this scenario, objects 10 and 7 can be deleted. Because B2 is already expired and was the first reference to object 7 and B3 held the last reference to object 7, this object can also be reclaimed.

Consider an example of the third case in which B3 is being expired, B2 is still alive, and B4 is already expired. In this scenario, objects 10 and 11 can be deleted.

Consider an example of the fourth case in which B3 is being expired and B2 and B4 are already expired. In this scenario, objects 7, 8, 10, 11 can be deleted.

As evidenced by these examples, the full impact of a single backup expiration may be determined based on the neighborhood of backups, in the incremental backup context.

Figure 12:
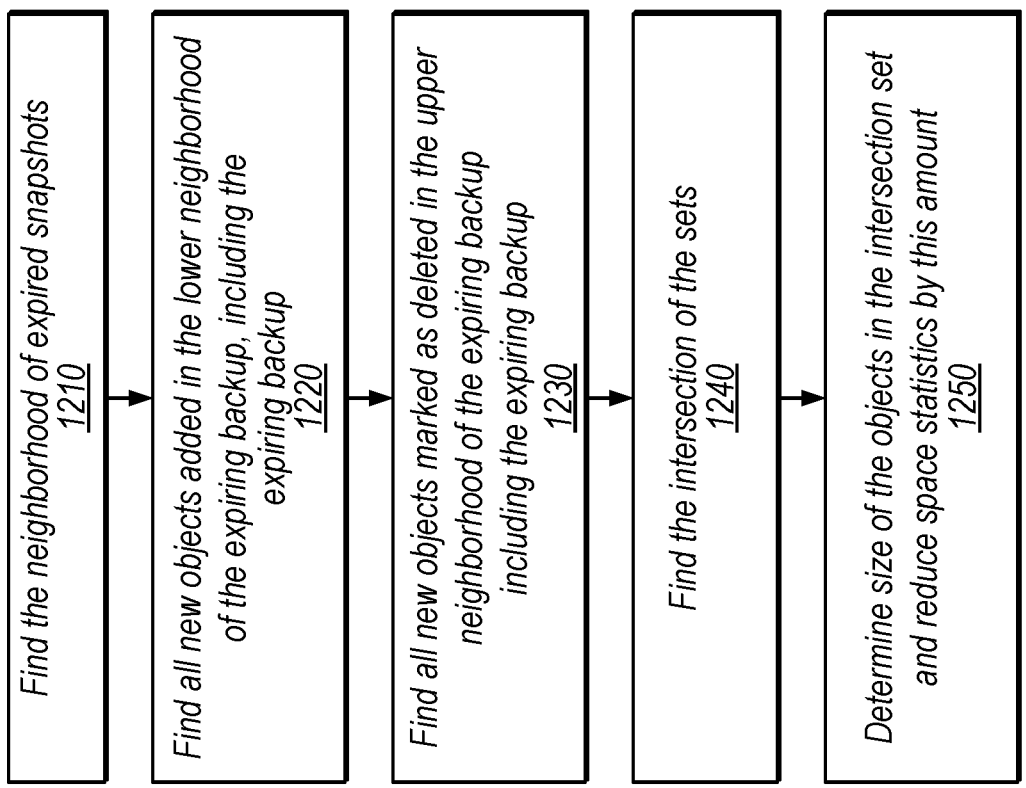
FIG. 12 is a diagram illustrating an example technique for metering in the context of expired backup snapshots, according to some embodiments.

FIG. 12 is a diagram illustrating an example technique for metering in the context of expired backup snapshots, according to some embodiments. At 1210, in the illustrated example, the backup service finds the neighborhood of expired snapshots. This may include determining the nearest non-expired backups to the backup being expired in both directions. For the four cases discussed above and B3 being expired, the neighborhoods are as follows (note that the neighborhood may extend further in cases where additional backups have expired).

Case 1: (B2, B4)
Case 2: (B1, B4)
Case 3: (B2, B5)
Case 4: (B1, B5)

At 1220, in the illustrated embodiment, the backup service finds all new objects added in the lower neighborhood of the expiring backup, including the expiring backup. For the four cases discussed above and B3 being expired, these objects are as follows:

Case 1: All new objects in (B2, B3]={10, 11, 12}
Case 2: All new objects in (B1, B3]={6, 7, 8, 9, 10, 11, 12}
Case 3: All new objects in (B2, B3]={10, 11, 12}
Case 4: All new objects in (B1, B3]={6, 7, 8, 9, 10, 11, 12}

At 1230, in the illustrated embodiment, the backup service finds all new objects deleted in the upper neighborhood of the expiring backup, including the expiring backup. For the four cases discussed above and B3 being expired, these objects are as follows:

Case 1: All the objects that were deleted in (B3, B4], i.e. {3, 7, 10}
Case 2: All the objects that were deleted in (B3, B4], i.e. {3, 7, 10}
Case 3: All the objects that were deleted in (B3, B5], i.e. {3, 4, 7, 8, 10, 11, 13}
Case 4: All the objects that were deleted in (B3, B5], i.e. {3, 4, 7, 8, 10, 11, 13}

At 1240, in the illustrated embodiment, the backup service finds the intersection of the sets determined at 1220 and 1230. This may be the set of objects that can be deleted and their space reclaimed. For the four cases discussed above and B3 being expired, these objects are as follows:

Case 1: {10}
Case 2: {7, 10}
Case 3: {10, 11}
Case 4: {7, 8, 10, 11}

At 1250, in the illustrated embodiment, the backup service determines the size of the objects in the intersection set and reduces space statistics by this amount (e.g., to allow rapid updates for client billing, for example).

Example Garbage Collection

FIGS. 13-17 relate to cleanup of metadata and data for expiring backups, according to some embodiments. Disclosed procedures may also be used to cleanup failed or partial backups.

Figure 13:
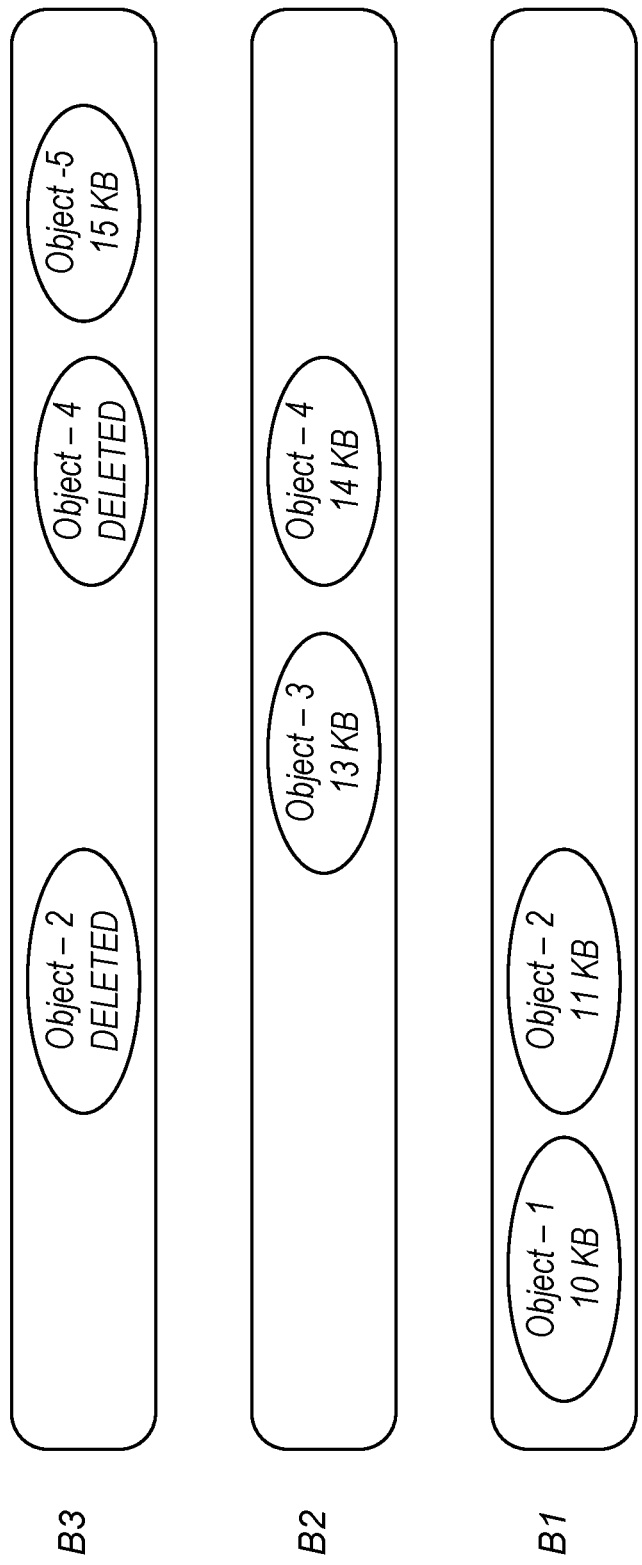
FIG. 13 is a diagram illustrating an example initial incremental backup scenario, according to some embodiments.

FIG. 13 is a diagram illustrating an example initial incremental backup scenario, according to some embodiments. In some embodiments, metadata for backups associated with a given local container (e.g., a bucket in a protection group) is layered, with each layer describing new metadata for a given backup relative to the previous backup, in an incremental fashion. Thus, the metadata layer for a given backup may describe only new objects created since the last backup and objects deleted since the last backup. Note that metadata may be stored separately from backup data, e.g., in an Athena structured database.

As shown, the metadata for B1 in FIG. 13 indicates objects 1 and 2 (e.g., using their respective keys, other identifying information, or both), which were created subsequent to the prior backup (not shown). The metadata for B2 indicates objects 3 and 4. The metadata for B3 indicates objects 2 and 4 were deleted and object 5 was created.

In some embodiments, the following information may be stored for local container backups: incremental backup cookie, S3 inventory time, positive delta statistics (object count and cumulative object size for objects added in the backup), and negative delta statistics (object count and cumulative object size for objects deleted in the backup). Various queries may be run on this information, e.g., to obtain information about the given backup or to configure a new backup.

In some embodiments, an incremental backup cookie is generated after each backup to identify the inventory state used to generate the backup. This may be beneficial when performing a subsequent backup, where performing the subsequent backup includes generating a differential based on a current inventory and the bucket inventory (identified by the cookie) that was used to generate the previous backup.

FIG. 14 is a diagram illustrating example initial backup statistics corresponding to the situation of FIG. 13, according to some embodiments. In some embodiments, backup statistics indicate the incremental object count, incremental size, restore object count, restore size, local container object count, and local container size. The local container count/ size may be cumulative and may be used for metering. Only the latest value of these statistics may be persisted.

Note that some statistics may be adjusted only for new objects and not adjusted for deleted objects (for example, incremental count/size may only be affected by new objects while restore count/size may also take deleted objects into account).

FIG. 15 is a diagram illustrating example actions in different garbage collection scenarios, according to some embodiments. When expiring a backup, cleaning up the metadata may reduce metadata query costs and cleaning up the data may reduce backup costs. Deleting the most recent backup may involve deleting the corresponding Athena partition, walking the metadata to find objects for deletion, deleting those objects, and deleting all corresponding metadata objects.

When expiring the non-latest backup, the backup service may let objects in the expiring backup move to the next backup. This may generate a new metadata layer that is a merged form of the expiring backup and the next layer up, which may replace both layers. The Athena partitions for both backups may be removed and a new partition added (potentially atomically).

The rules of FIG. 15 may be used for such a merge. For example, the first two rows indicate that (A) when a given object entry is present in the expiring backup metadata but not in the next backup metadata or (B) when a given object entry is not present in the expiring backup metadata but is present in the next backup metadata, the new metadata should preserve the object entry. If the object entry is present in the expiring backup metadata but marked deleted in the next backup metadata, the object entry should be dropped and the object deleted. If (A) the backup entry is not present in the expiring backup metadata but marked deleted in the next backup metadata or (B) the object entry is marked as deleted in the expiring backup metadata and not present in the next backup metadata, the deletion should be preserved in the new metadata.

Figure 16:
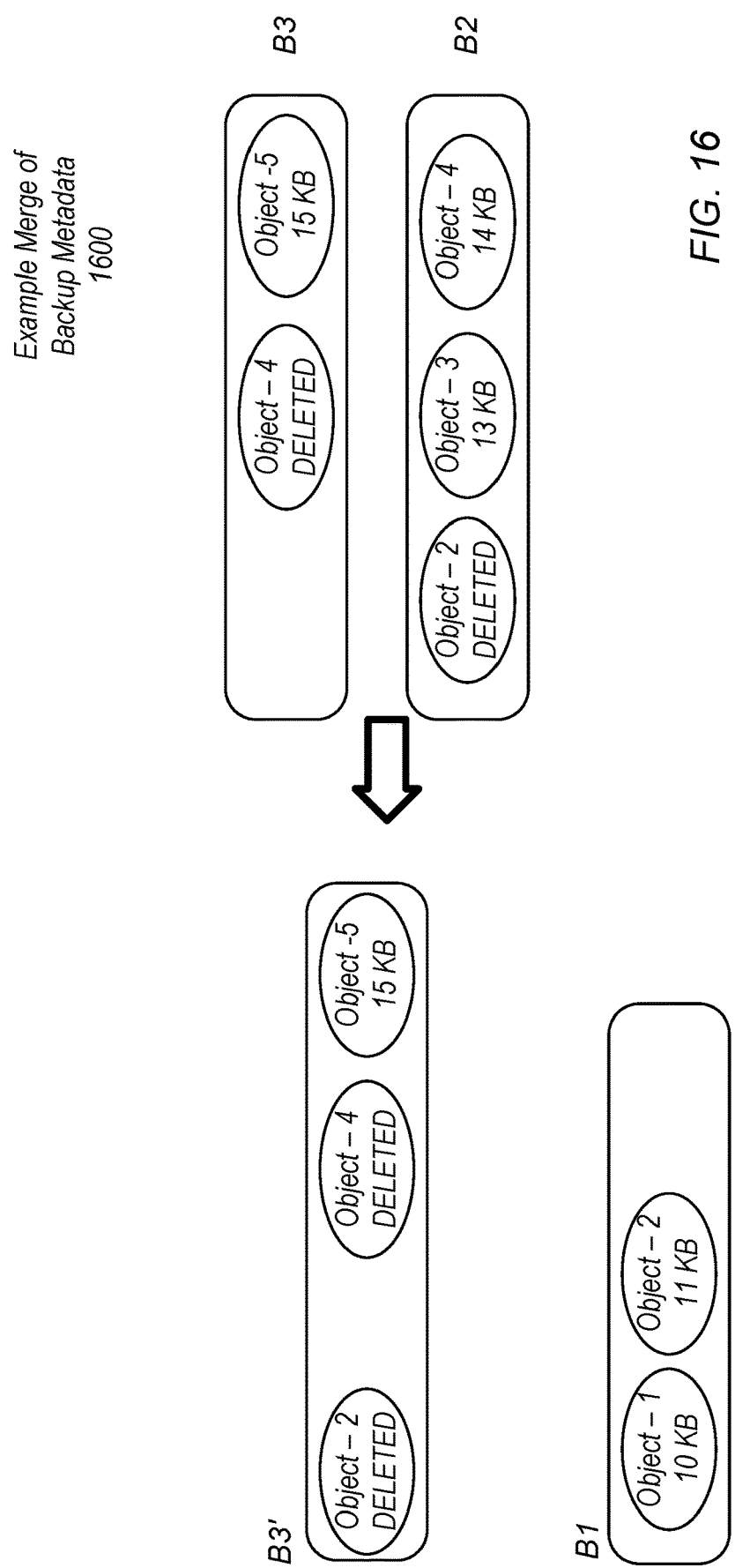
FIG. 16 is a diagram illustrating example merging of backup data using the rules of FIG. 15, according to some embodiments.

FIG. 16 is a diagram illustrating example merging of backup data using the rules of FIG. 15, according to some embodiments. As shown, the metadata for backups B2 and B3 is merged to form metadata B3', which includes the deletion of objects 2 and 4 and the addition of object 5.

Generally, the merge procedure may obtain the backup after the expiring backup, run a query to obtain a sorted list of objects from the two backups for comparison, merge the two query results (e.g., using the results of FIG. 15), generate new metadata for the next backup, delete target objects when possible, and remove the expired/next backup partitions and add the new partition for the next backup.

Note that objects larger than a threshold (e.g., larger than 64 KB) may be stored as individual objects and may be deleted as soon as the metadata pointing to the object is dropped. Smaller objects may be packed into a target object and reference counts may be included in the metadata and used to ensure that a target object is only deleted once it is no longer referenced by any metadata entry. Backup objects that store multiple packed objects may have tag information indicating backup identifier (which backup created this object), total packed objects, and number of deleted objects (which may be updated each time a small object is dropped during metadata merge).

FIG. 17 is a diagram illustrating example updated backup statistics after the merge, according to some embodiments. In the illustrated example, the incremental statistics of B3' have changed to reflect the garbage collection operation as a result of expiring B2, although the restore state for B3' are the same as those of B3 prior to the merge.

Example Carry-Over Work Technique

In various contexts, an incremental backup may be only partially performed. For example, objects to be backed up may be missing or have incorrect permissions such that they cannot be accessed. In this scenario the overall incremental backup may proceed but may be marked as a partial backup. The backup service may inform one or more users that the backup proceeded but was not complete. In some situations, it may be desirable to backfill partial backups once missing objects are accessed for a future backup, as discussed in detail below.

Figure 18:
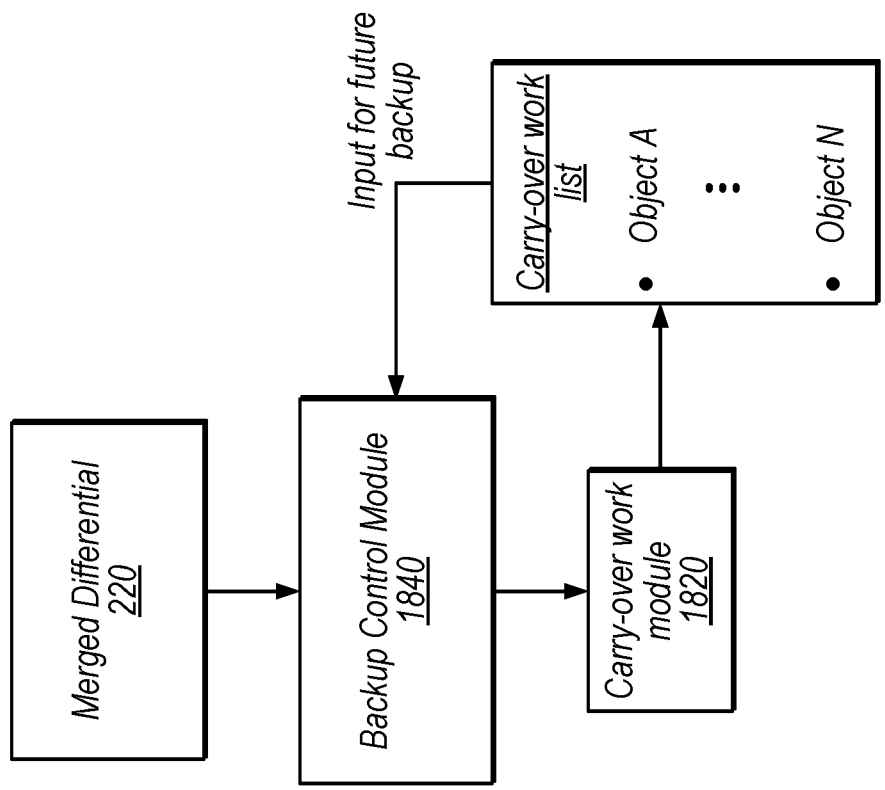
FIG. 18 is a block diagram illustrating an example carry-over work technique, according to some embodiments.

FIG. 18 is a block diagram illustrating an example carry-over work technique, according to some embodiments. In the illustrated embodiment, the technique utilizes merged differential 220, backup control module 1840, and carry-over work module 1820. In some embodiments, a carry-over work procedure is performed in situations where a backup is partially fulfilled or performed.

In the illustrated embodiment, merged differential 220 is input to backup control module 1840 to indicate objects to be included in the next backup. One or more objects listed in merged differential 220 that were scheduled to be included in the next backup may fail.

In some embodiments, backup control module 1840 generates a list of failures of the one or more objects not included in the backup and provides the list to carry-over work module 1820 to be included in a future backup.

In the illustrated embodiment, carry-over work module 1820 receives, as input, the list of failures and generates a carry-over work list of objects that are to be included in a future backup. In some embodiments, the list of objects included in the carry-over work list are prioritized and processed for inclusion in a future backup before objects of the merged differential for the future backup.

In traditional techniques, objects that failed to be included in a backup (e.g., due to access restrictions) may cause an indefinite number of retries of the backup, may lose the objects that fail to be included in the backup, etc. Note that a user may change one or more protection group filter parameters between backups. As a result, objects that were already present in a previous inventory, but did not meet the filter parameters at the time, may need to be included in a subsequent backup. These objects may not appear in a merged differential 220 because they have not changed. Therefore, in some embodiments, the updated filters may be applied to the inventory from a previous backup. Items in the inventory that match the updated filter parameters may be included in the next backup, in addition to any items on the carry-over work list.

Disclosed carry-over work techniques may advantageously improve data reliability, relative to traditional techniques, while allowing backups to proceed even if some objects cannot be backed up successfully.

Example Backfill Technique

Figure 19:
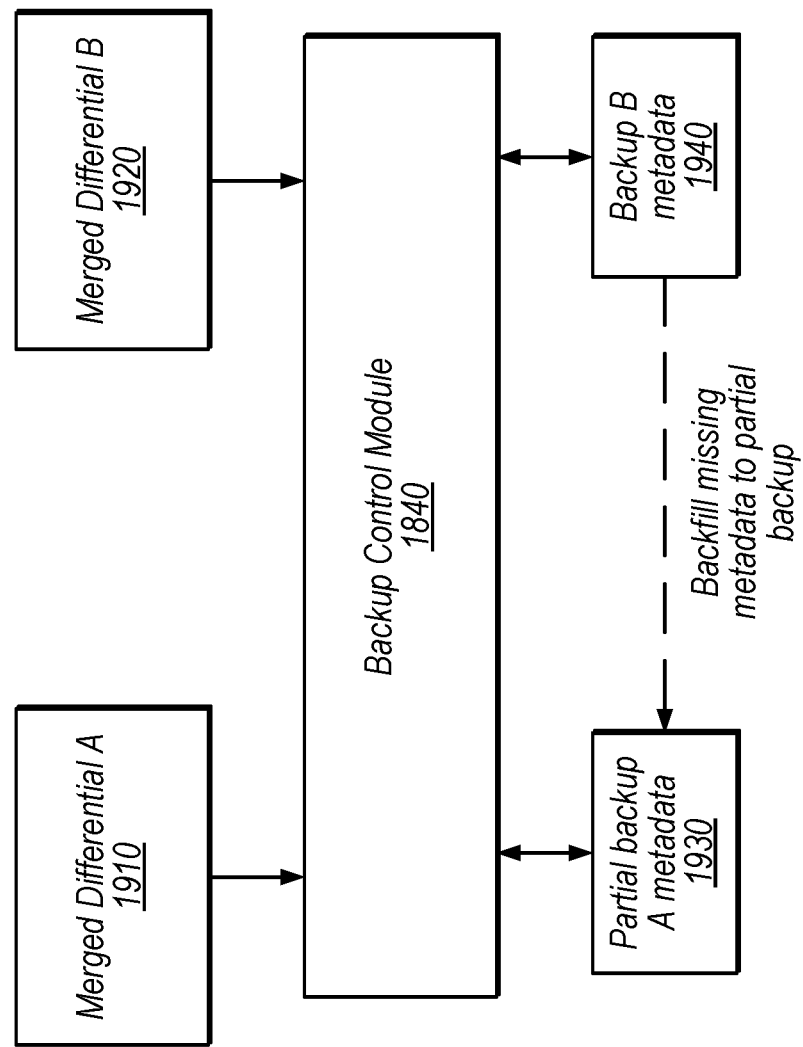
FIG. 19 is a block diagram illustrating an example backfill technique, according to some embodiments.

FIG. 19 is a block diagram illustrating an example backfill technique, according to some embodiments. In the illustrated embodiment, the technique utilizes merged differential A 1910 and merged differential B 1920, backup control module 1840, partial backup A metadata 1930, and backup B metadata 1940.

In the illustrated embodiment, merged differential A is a listing of all differences (e.g., added objects, removed objects, amended objects, etc.) generated at a time A between two consecutive inventories (not shown), e.g., as discussed above with reference to FIG. 2. In the illustrated embodiment, merged differential B is a listing of all differences (e.g., added objects, removed objects, amended objects, etc.) generated at a time B between two consecutive inventories (not shown). Time B is subsequent to time A, in this example.

In some embodiments, backup control module 1840 receives merged differential A 1910, for which a backup instance is partially performed. Therefore, as shown, the metadata 1930 for backup A corresponds to a partial backup that was not fully complete.

In some embodiments, backup control module 1840 receives merged differential B 1920. In this example, the backup for differential B is complete and corresponds to backup B metadata 1940.

In the illustrated embodiment, a portion of backup B metadata 1940 is used to backfill missing metadata in partial backup A metadata 1930. For example, backup control module 1840 may move metadata for one or more objects that were carried over from backup A to backup B from metadata 1940 to metadata 1930. Thus, partial backup A metadata 1930 may become a complete backup after the backfill, or at least include additional backup metadata relative to its initial state.

When using traditional techniques that do not utilize carry-over work techniques, backfill techniques, or both, objects that are part of a merged differential that is partially performed may not be included in a backup instance and may cause data reliability concerns when a restoration operation is performed.

Disclosed backfill techniques may advantageously improve restoration operations for carry-over work, e.g., by listing new or modified objects in metadata for the proper backup (corresponding to the addition or modification), rather than metadata for a later backup. For example, consider a set of backups where a user requests to restore backup 3. If an object should have been included in backup 3, but failed and was instead included in backup 4 using carry-over, the restoration query might not properly include the object without backfill. If the object is backfilled to the backup 3 after succeeding in backup 4, however, the restoration query may properly include the object.

Example Re-Seeding and Independent Incremental Backups

Note that certain situations, such as data errors, may result in additional backup operations and data, relative to default operation. For example, if the backup service missed an object in an incremental backup, a re-seeding backup may remedy the error. A re-seeding backup does not depend on any differentials generated from previous inventories, and subsequent backups to the re-seeding backup may be performed in an incremental manner. Therefore, a re-seeding backup may utilize an inventory of all objects currently in the datastore, apply protection group filters, and backup objects that match the filters.

A re-seeding backup may have various disadvantages. For example, because a re-seeding backup does not utilize differentials, it may include objects that are already backed up by previous backups, which may double backup costs for those objects, although customers should typically not be charged for such duplicates.

Therefore, in some embodiments, the backup service may build an independent incremental data structure that may be used to identify items to be backed-up instead of a re-seeding backup. This may reduce or avoid double backups of objects. FIGS. 20A and 20B provide a comparison of re-seeding and independent incremental techniques, according to some embodiments.

FIG. 20A is a block diagram illustrating an example re-seeding backup, according to some embodiments. In the illustrated example, three backups are shown for a data store. Backup 1 is a seeding backup, backups 2 and 4 are incremental backups, and backup 3 is a re-seeding backup. As shown, re-seeding backup 3 fixes an error in backup 1 that caused a failure to backup object B.

In this example, backup 1 backs up object A but misses object B due to a bug. Backup 2 backs up object C only, e.g., based on a differential that shows object C was added to the inventory. Because the differential between the inventories for backup 1 and backup 2 does not show a change in B, however, object B is still not backed up.

To remedy the error, re-seeding backup 3 performs a backup of all objects in the inventory that match any filter parameters, objects A, B, and C in this case. The re-seeding backup, in this example, includes objects A, B, and C, even though object A was already included in backup 1 and object C was already included in backup 2. Therefore, objects A and C are duplicated, increasing storage costs.

With reference to the illustrated example provided, a customer may be charged for backups 1, 2 and 4, while the new objects in the re-seeding backup 3 are the service provider's responsibility. Further, if some backups are expired, objects may remain in the corrective backup 3 even when they no longer need to be backed up. Therefore, reducing the number of objects in corrective backups may be desirable in terms of data size and cost.

FIG. 20B is a block diagram illustrating an example independent incremental backup, according to some embodiments. In the illustrated embodiment, an independent incremental mitigates at least some of the disadvantages of traditional re-seeding backups discussed above.

Backups 1 and 2 correspond to the same backups discussed above with reference to FIG. 20A. For backup 3, in the illustrated embodiment, an independent incremental backup is performed instead of creating a re-seeding backup.

The backup service may generate an independent incremental data structure by adding objects that are new for each backup, starting with the seeding backup. Alternatively, the backup service may perform a query, similar to a query for restoration to generate an independent incremental. This query may determine all objects referred to by the previous backup (which may include objects indicated in metadata from earlier backups as well as new objects backed up for the previous backups). For example, a query for backup 2 would return object C from backup 2 and object A referred to by backup 1.

In the illustrated example, the independent incremental may specify the information in the "all objects in backup" field of FIG. 20B. For example, after backup 1, object A has been backed up. After backup 2, the independent incremental shows that objects A and C have been backed up, even though they are included in different incremental backups.

To determine which objects to backup for the corrective backup 3, in this example, the backup service compares the inventory for the current backup with the independent incremental data structure. In this example, the only object that is different is object B, which is stored in backup 3. Note that the error has been corrected, in this example, without double storing objects A and C. Therefore, disclosed independent incremental backups may reduce or mitigate data sizes and costs associated with traditional re-seeding backups.

Example Restoration Using Parallel Data Chunk Processing

In some embodiments, parallelizing workloads may be useful in various contexts, e.g., to increase performance.

Leveraging parallelization, different cloud worker modules may process chunks of data in parallel, which may enable entities to restore important data in a time-sensitive and affordable manner. Generating data chunks for parallel processing may be challenging in certain contexts, however. For example, it may be desirable to process chunks in parallel that will have similar processing times rather than waiting for a long-running chunk to finish after the others. Chunk processing time may vary based on various factors, however. Further, objects with large numbers of versions may be split across chunks which may introduce dependencies between different chunks.

Figure 21:
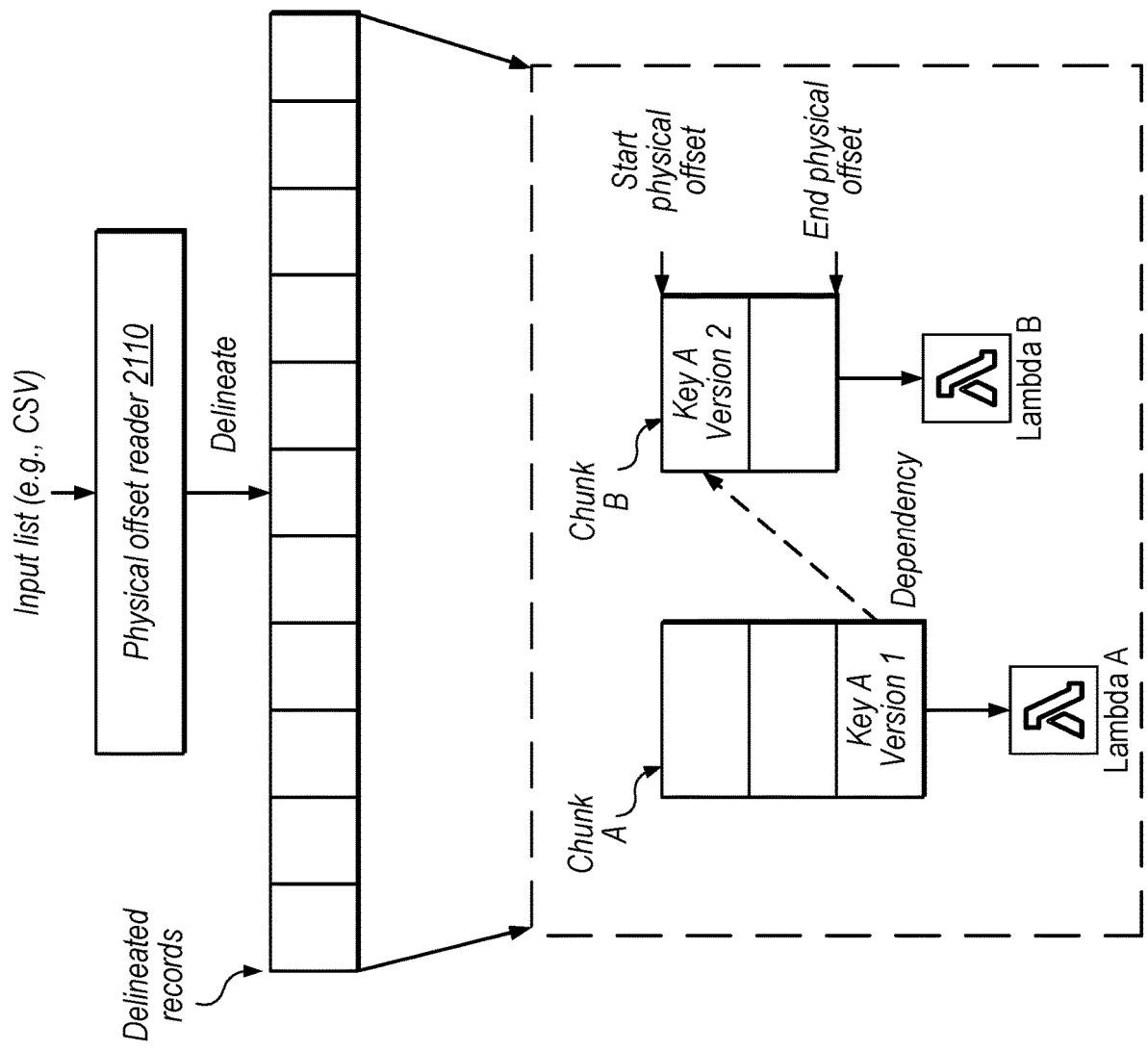
FIG. 21 is a block diagram illustrating example data chunks, according to some embodiments.

FIG. 21 is a block diagram illustrating example data chunks, according to some embodiments. In the illustrated embodiment, physical offset reader 2110 delineates an input list of objects into chunks, e.g., for data restoration. In other embodiments, similar techniques may be performed in any of various contexts (e.g., when performing a backup).

In the illustrated embodiment, physical offset reader 2110 receives, as input, a comma-separated-value (CSV) list of objects to be restored (e.g., generated by a query of the metadata database) and delineates objects into chunks by generating physical offset information (e.g., that indicates the start and end positions of a given chunk). For example, physical offset reader 2110 may iterate through a memory space (e.g., in which the list is stored) until one or more separators (e.g., comma, semi-colon, etc.) are identified; at which point physical offset information (e.g., an offset from a base address of the list) may be determined. Physical offset reader 2110 may identify the start position of a chunk and the end position of the chunk by specifying the physical offsets of the separator for a first object in the chunk and the separator for a last object in the chunk. In some embodiments, each object identified by the list has key and version ID metadata that uniquely identifies an object and its version. In some embodiments, the physical offset information may be passed to one or more Lambda functions for processing.

The backup service may issue chunks to independent lambda functions (e.g., Lambda A, Lambda B, etc.), e.g., by providing start and end physical offsets for a given chunk to a given Lambda function. Note that this may allow the lambda functions to access the list without copying the list. The processing by a Lambda function may include retrieving objects indicated by a chunk from backup storage and storing them in a restoration data store (e.g., one or more target buckets).

In some embodiments, physical offset reader 2110 implements a first technique that assigns the same number of objects to each chunk. This may result in some chunks taking substantially longer to process, however. In some embodiments, physical offset reader 2110 implements a second technique, that considers object size and the number of versions of an object into account when creating chunks, to create chunks that are estimated to have similar processing times. According to this second technique, however, some objects that have a large number of versions (e.g., according to some threshold number of versions, threshold size of versions of the object, etc.) may need to be split between multiple chunks in order to achieve desired parallelization. This may introduce dependencies between chunks, given that a stack data structure may need to be rebuilt according to an original order after parallelization. In particular, a chunk with a younger version of an object should not complete processing before completion of a chunk with an older version of the object, in some embodiments.

Consider the following example of dependencies between chunks in which the last object in chunk A and the first object in chunk B are versions of the same object and therefore share the same key (e.g., Key A). In this scenario, chunk B is dependent on chunk A and versioning may be used to rebuild the stack (not shown) in the proper order for a restore, such that object versions appear in their original order. In such scenarios, Lambda A should complete its processing of chunk A before Lambda B completes its processing of chunk B to ensure object versions are restored in order.

Figure 22:
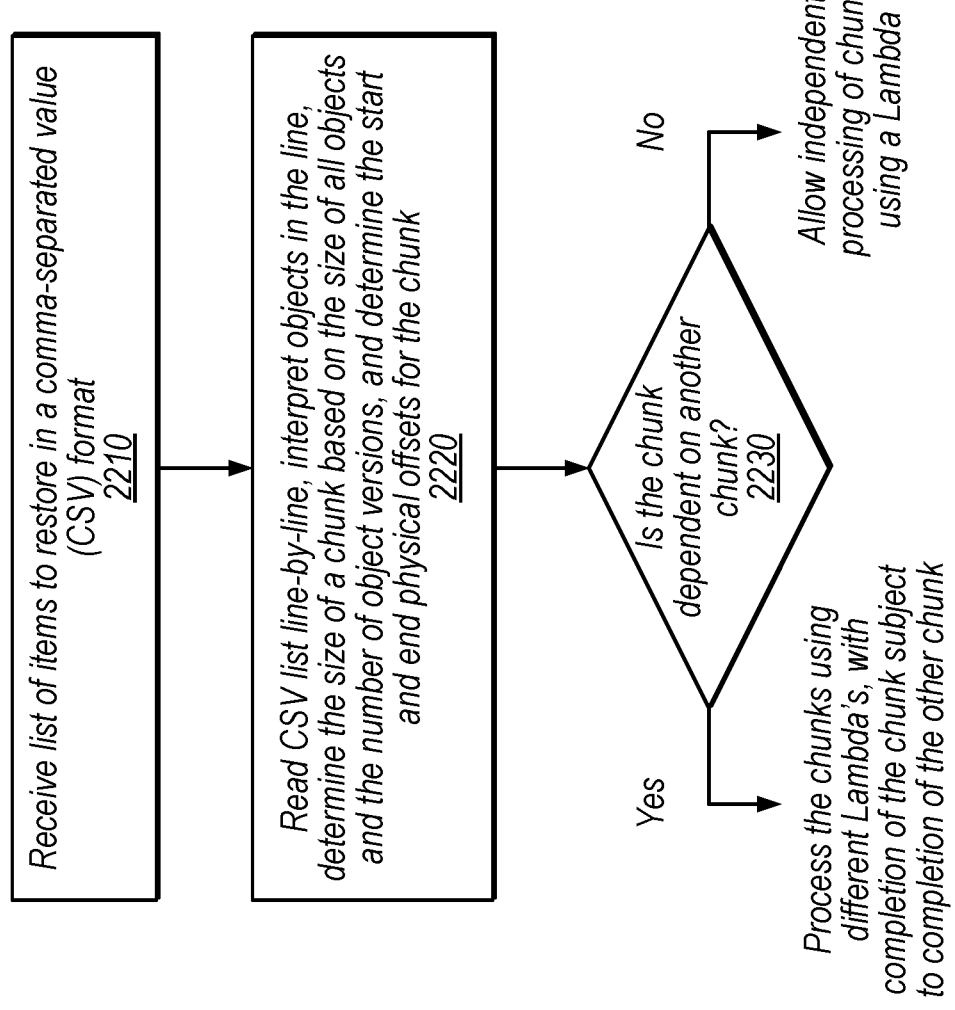
FIG. 22 is a flow diagram illustrating an example data restoration method using data chunks, according to some embodiments.

FIG. 22 is a flow diagram illustrating an example data restoration method that uses data chunks and handles dependencies, according to some embodiments.

At 2210, in the illustrated embodiment, a CSV list of items is received. In some embodiments, the CSV list of items is a list of objects that are specified in a restore operation. In other embodiments, various other data structures may be utilized, e.g., a linked-list, an indexed structure, etc.

At 2220, in the illustrated embodiment, the backup service reads the CSV list line-by-line, reads objects in each line, determines the size of a chunk based on the size of objects and the number of object versions, and stores the start and end physical offsets for the chunk. In some embodiments, one or more chunks are generated based on the received CSV list.

At 2230, in the illustrated embodiment, the backup service determines whether one chunk is dependent on another chunk. In some embodiments, a dependency exists when the last object in a first chunk and the first object in a second chunk share the same key (e.g., Key A).

In the illustrated example, when the determination is made that the chunk is dependent on another chunk, the backup service processes the chunks in parallel using different Lambda's, with completion of the chunk subject to completion of the other chunk.

For example, in some embodiments, the backup service may process chunks in parallel in the absence of dependencies. In response to detecting a dependency among two given chunks, the backup service may process the two chunks at least partially in parallel, but completion of the processing may be serialized (e.g., work for a chunk may not complete until all chunks on which it depends have completed). In some embodiments, a chunk may be considered complete once the last byte of the last object of the chunk has been processed. In other embodiments, when the determination is made that the chunk is dependent on another chunk, the backup service may halt processing of the chunk until processing of the other chunk is complete (although chunks without dependencies may proceed in parallel). In some embodiments, multi-part uploads may be used to perform a dependent chunk, e.g., performing most of the chunk with one upload, waiting for the dependency to be satisfied for the last upload, and stitching up the upload parts afterwards.

For example, consider two dependent chunks A and B that contain multiple versions of the same object. Chunk B is dependent on chunk A, and chunk A and chunk B may be processed in parallel by Lambda's A and B, respectively. To ensure correct versioning and rebuilding of the stack, restoration of the multiple versions of the single object may be pipelined. In such scenarios, Lambda B may process all but the last byte of the last object of chunk B; until Lambda A has completed processing chunk A, at which point the last byte of the last object of chunk B may be processed to signal completion of chunk B.

In some embodiments, when the determination is made that the chunk is not dependent on another chunk, the backup service may begin and complete processing of the chunk using a lambda without waiting for another process to conclude.

Disclosed data chunk techniques may advantageously improve parallelization and performance of data restoration operations, relative to traditional techniques.

Example Object-Level Incremental Backups Method

Figure 23:
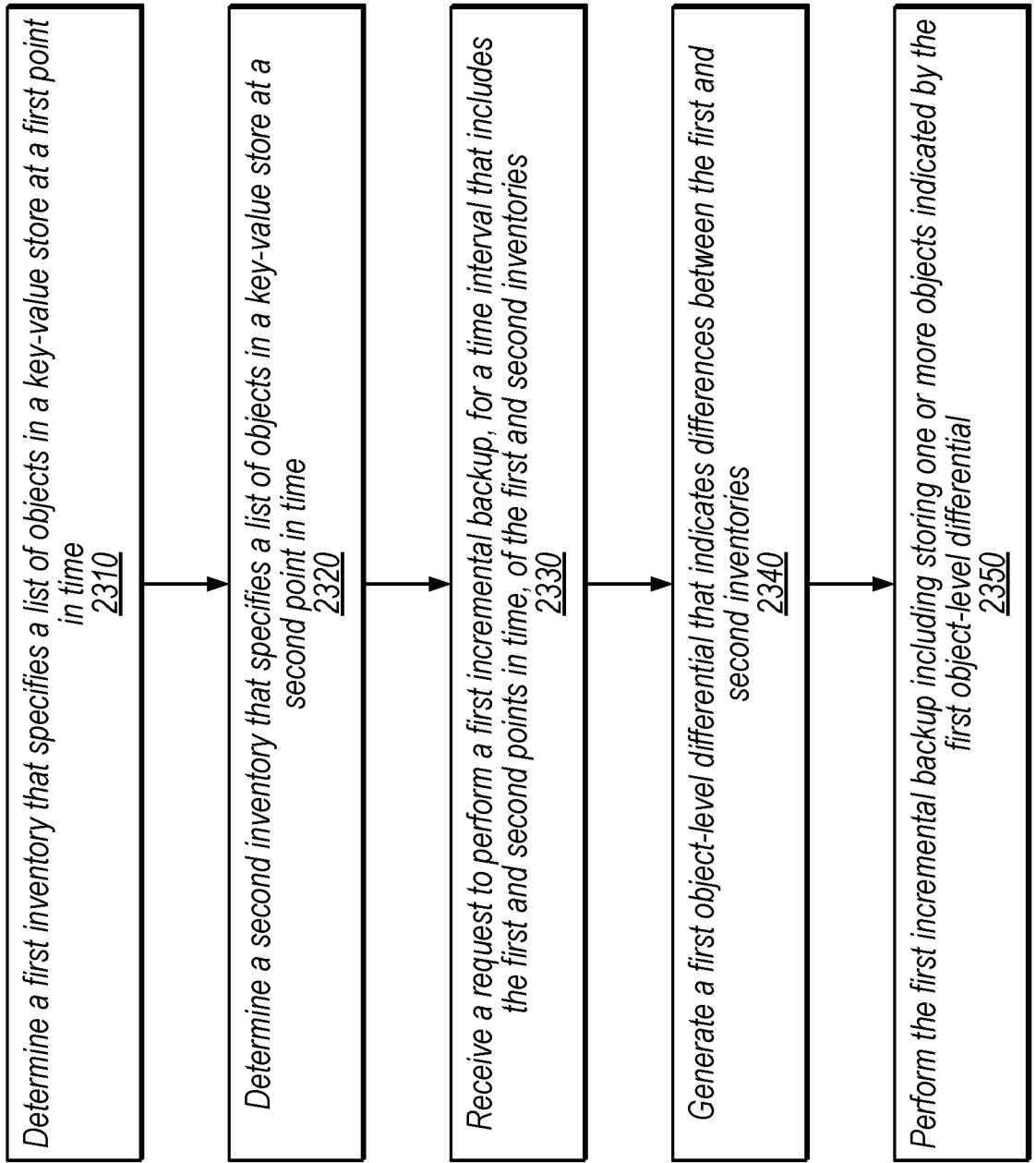
FIG. 23 is a flow diagram illustrating an example method for performing an object-level incremental backup, according to some embodiments.

FIG. 23 is a flow diagram illustrating an example method for performing an object-level incremental backup, according to some embodiments. The method shown in FIG. 23 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2310, in the illustrated embodiment, a computing system determines a first inventory that specifies a list of objects in a key-value store at a first point in time. In some embodiments, the first inventory is an object-level inventory.

At 2320, in the illustrated embodiment, the computing system determines a second inventory that specifies a list of objects in a key-value store at a second point in time. In some embodiments, the second inventory is an object-level inventory.

In some embodiments, the first and second inventories may include a list of all objects currently specified in one or more Amazon S3 buckets.

At 2330, in the illustrated embodiment, the computing system receives a request to perform a first incremental backup, for a time interval that includes the first and second points in time, of the first and second inventories.

At 2340, in the illustrated embodiment, the computing system generates a first object-level differential that indicates differences between the first and second inventories.

In some embodiments, the object-level differential indicates differences between the first and second inventories, including added objects, amended objects, deleted objects, etc., for example.

At 2350, in the illustrated embodiment, the computing system performs the first incremental backup that includes storing one or more objects indicated by the first object-level differential.

In some embodiments, the computing system determines a third inventory that specifies a list of objects in a key-value store at a third point in time and generates a second object-level differential that indicates differences between the second and third inventories. In some embodiments, the computing system generates a temporal merged object-level differential based on at least the first and second object-level differentials.

In some embodiments, the computing system performs the first incremental backup that includes objects indicated by the temporal merged object-level differential.

In some embodiments, the computing system filters the temporal merged object-level differential based on a protection-group policy and performs the first incremental backup that includes a filtered subset of objects indicated by the temporal merged object-level differential.

In some embodiments, the computing system tracks one or more objects for which storage failed during the first incremental backup.

In some embodiments, the computing system generates a list of carry-over-work that includes the one or more objects for which storage failed during the first incremental backup and performs a subsequent incremental backup that includes storing one or more objects indicated by the list of carry-over-work.

In some embodiments, the computing system backfills metadata for the successfully stored objects that failed during the first incremental backup, such that backfilled metadata for the successfully stored objects is associated with the first incremental backup.

In some embodiments, the computing system receives a request to perform a restore of at least a portion of a backup. In some embodiments, in response to the request, the computing system delineates a list of objects to be restored into multiple chunks, indexes the chunks of data using offset values within the list of objects, and processes, at least partially in parallel, different chunks of data using different cloud worker functions.

In some embodiments, the computing system processes a first chunk of data and a second chunk of data using separate cloud worker functions. In some embodiments, the computing system may determine that the second chunk of data is dependent on the first chunk of data and subsequently delay completion of processing the second chunk of data until completion of the first chunk of data.

In some embodiments, the second chunk of data is dependent on the first chunk of data when the first and second chunks of data include different versions of the same object.

Example Protection Group Method

Figure 24:
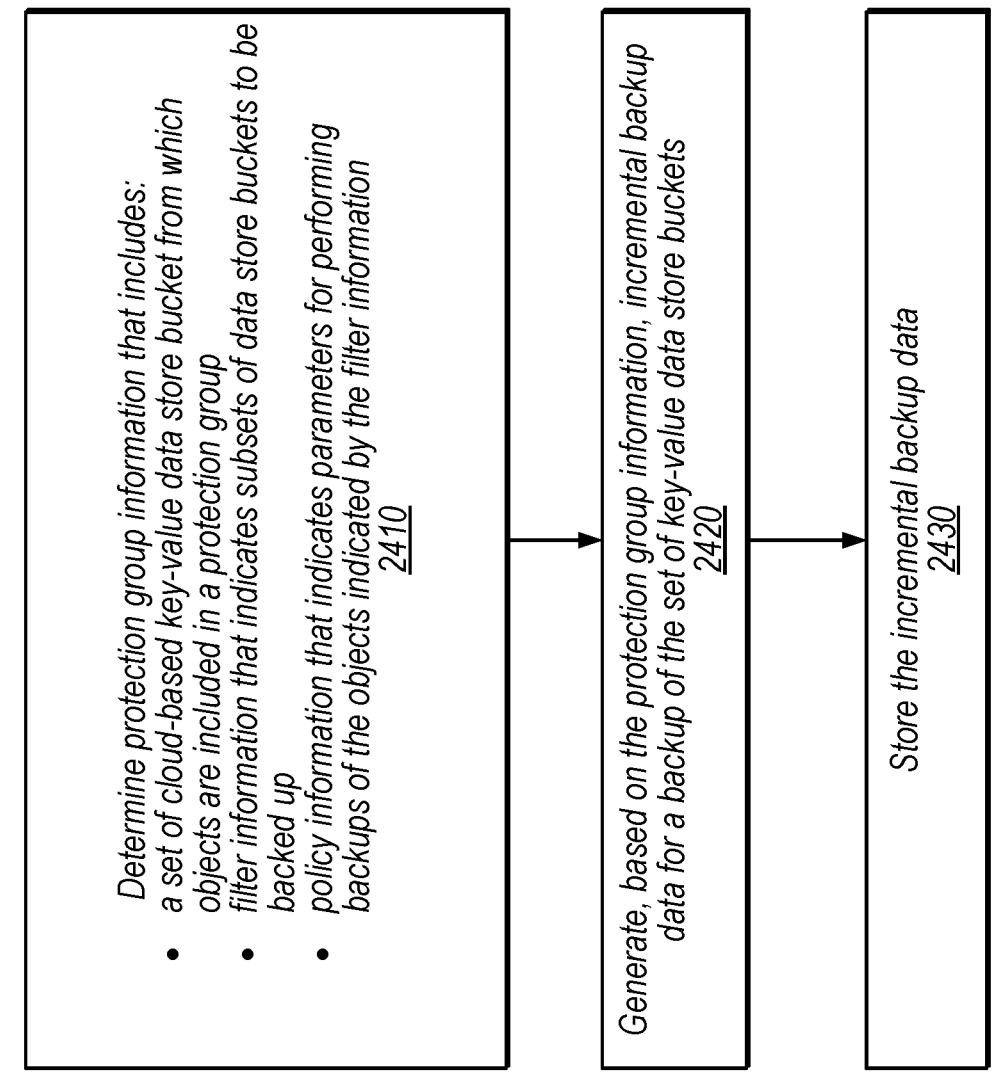
FIG. 24 is a flow diagram illustrating an example method for performing a backup based on protection group information, according to some embodiments.

FIG. 24 is a flow diagram illustrating an example method for performing a backup based on protection group information, according to some embodiments. The method shown in FIG. 24 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2410, in the illustrated embodiment, a computing system determines protection group information. In some embodiments, the protection group information includes a set of cloud-based key-value data store buckets from which objects are included in a protection group, filter information that includes subsets of data store buckets to be backed up, and policy information that indicates parameters for performing backups of the objects indicated by the filter information.

In some embodiments, the cloud-based key-value data store buckets may be Amazon S3 buckets, for example.

In some embodiments, the filter information may include a storage class, key attributes, and version number. These are examples of types of filter information and are not intended to limit the scope of the present disclosure; other types of filter information may be used.

In some embodiments, the key attributes include one or more prefixes that are to be included in the backup and one or more sub-prefixes that are to be excluded from the backup.

In some embodiments, the policy information may indicate backup frequency, backup time, retention parameters, and target storage tier, for example.

In some embodiments, the target store tier policy information is selected from multiple target storage tiers that includes at least a first tier that has a first access time attribute and a second tier having a second, different access time attribute.

At 2420, in the illustrated embodiment, the computing system generates, based on the protection group information, incremental backup data for a backup of the set of key-value data store buckets.

At 2430, in the illustrated embodiment, the computing system stores the incremental backup data.

In some embodiments, the computing system performs a query across multiple backed-up buckets of the protection group and provides objects from multiple buckets that satisfy the query.

In some embodiments, the query includes search criteria, including one or more first search criteria for metadata for the set of cloud-based key-value data store buckets and one or more second search criteria for metadata that is generated, by the computing system, in conjunction with generating the incremental backup data.

In some embodiments, the search criteria include one or more of the following criteria: key, backup version, object version, object type, object size, object hash information, and bucket identifier.

In some embodiments, the object version criteria indicates whether the query is to return a latest version of an object or multiple versions of an object.

In some embodiments, in response to expiration of an incremental backup, the computing system determines a set of expired objects based on metadata for multiple incremental backups. In some embodiments, this includes determining a most recent non-expired backup and a next non-expired backup relative to the expiring backup, determining a first set of objects added in the most recent non-expired backup and the expiring backup, determining a second set of objects deleted in the next non-expired backup and the expiring backup, and determining the set of expired objects based on the intersection of the first and second sets.

In some embodiments, the computing system determines a data size of the set of expired objects prior to deletion of the set of expired objects.

In some embodiments, the incremental backup data uses cloud-based storage.

In some embodiments, determining the set of key-value data store buckets includes selecting data store buckets from multiple cloud computing environments.

Example Computer System

Figure 25:
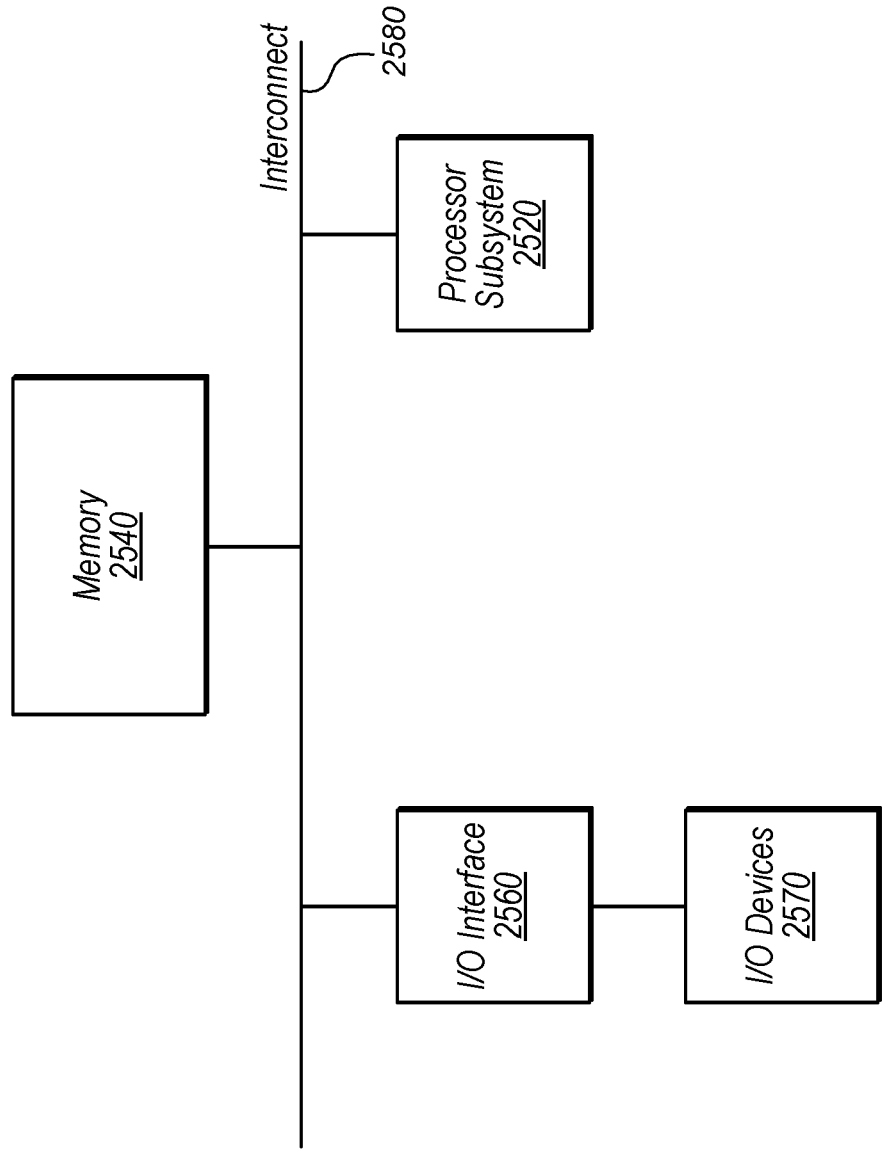
FIG. 25 is a block diagram illustrating an example computer system, according to some embodiments.

Referring now to FIG. 25, a block diagram of an example computer system 2500 is depicted, which may implement one or more computer systems, such as one or more cloud-based server computer systems used to implement one or more of the object-level incremental backups of FIG. 2, the protection groups of FIG. 3, the metering techniques of FIG. 11, the garbage collection service of FIG. 13, and other disclosed techniques, according to various embodiments. Computer system 2500 includes a processor subsystem 2520 that is coupled to a system memory 2540 and I/O interfaces(s) 2560 via an interconnect 2580 (e.g., a system bus). I/O interface(s) 2560 is coupled to one or more I/O devices 2570. Computer system 2500 may be any of various types of devices, including, but not limited to, a server computer system, personal computer system, desktop computer, laptop or notebook computer, mainframe computer system, server computer system operating in a datacenter facility, workstation, network computer, etc. Although a single computer system 2500 is shown in FIG. 25 for convenience, computer system 2500 may also be implemented as two or more computer systems operating together.

Processor subsystem 2520 may include one or more processors or processing units. In various embodiments of computer system 2500, multiple instances of processor subsystem 2520 may be coupled to interconnect 2580. In various embodiments, processor subsystem 2520 (or each processor unit within 2520) may contain a cache or other form of on-board memory.

System memory 2540 is usable to store program instructions executable by processor subsystem 2520 to cause system 2500 to perform various operations described herein. System memory 2540 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 2500 is not limited to primary storage such as system memory 2540. Rather, computer system 2500 may also include other forms of storage such as cache memory in processor subsystem 2520 and secondary storage on I/O devices 2570 (e.g., a hard drive, storage array, etc.). In some embodiments, these other forms of storage may also store program instructions executable by processor subsystem 2520.

I/O interfaces 2560 may be any of various types of interfaces configured to couple to and communicate with other devices, according to various embodiments. In one embodiment, I/O interface 2560 is a bridge chip (e.g., Southbridge) from a front-side to one or more back-side buses. I/O interfaces 2560 may be coupled to one or more I/O devices 2570 via one or more corresponding buses or other interfaces. Examples of I/O devices 2570 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 2570 includes a network interface device (e.g., configured to communicate over WiFi, Bluetooth, Ethernet, etc.), and computer system 2500 is coupled to a network via the network interface device.

As used herein, a "module" refers to software or hardware that is operable to perform a specified set of operations. A module may refer to a set of software instructions that are executable by a computer system to perform the set of operations. A module may also refer to hardware that is configured to perform the set of operations.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   determining, by a computing system, protection group information that includes:
     bucket information that identifies a set of cloud-based key-value data store buckets from which objects are included in a protection group;
     filter information that indicates subsets of key-value objects from the set of data store buckets to be backed up; and
     policy information that indicates parameters for performing backups of the objects indicated by the filter information;
   generating, by the computing system based on the protection group information, object-level incremental backup data for a backup of objects from the set of key-value data store buckets, wherein the object-level incremental backup data includes data for individual key-value objects that have changed subsequent to a previous backup;
   storing, by the computing system, the incremental backup data in multiple cloud-based key-value data store backup buckets;
   performing, by the computing system based on the protection group information, a query across the multiple backup buckets; and
   providing, by the computing system, backed-up objects that satisfy the query from multiple buckets of the backup buckets.

2. The method of claim 1, wherein the filter information includes key field filter information, one or more storage classes, and version criteria for data store buckets to be backed up.

3. The method of claim 2, wherein the key field filter information includes one or more prefixes to be included and one or more sub-prefixes to be excluded from the backup.

4. The method of claim 1, wherein the policy information includes backup frequency and target storage tier information for performing backups of the data store buckets.

5. The method of claim 4, wherein the target storage tier information is selected from multiple target storage tiers, including at least:
   a first tier having a first access time attribute; and
   a second tier having a second, different access time attribute.

6. The method of claim 1, wherein the query includes search criteria, including one or more first search criteria for metadata for the set of cloud-based key-value data store buckets and one or more second search criteria for metadata generated by the computing system in conjunction with generating the incremental backup data.

7. The method of claim 6, wherein the search criteria include one or more of the following criteria: key, backup version, object version, object type, object size, object hash information, and bucket identifier.

8. The method of claim 7, wherein object version criteria indicates whether the query is to return a latest version of an object or multiple versions of an object.

9. The method of claim 1, further comprising the computing system:
   in response to expiration of an incremental backup, determining a set of expired objects, wherein the determining is based on metadata for multiple incremental backups.

10. The method of claim 9, wherein the determining includes:
    determining a most recent non-expired backup and a next non-expired backup relative to the expiring backup;
    determining a first set of objects added in the most recent non-expired backup and the expiring backup;
    determining a second set of objects deleted in the next non-expired backup and the expiring backup; and
    determining the set of expired objects based on the intersection of the first and second sets.

11. The method of claim 10, further comprising:
    determining a data size of the set of expired objects prior to deletion of the set of expired objects.

12. The method of claim 1, wherein the storing the incremental backup data uses cloud-based storage.

13. The method of claim 1, wherein the determining the set of key-value data store buckets includes selecting data store buckets from multiple cloud computing environments.

14. A non-transitory computer-readable medium having program instructions stored thereon that are executable to cause a computer system to perform operations comprising:
    determining protection group information that includes:
      bucket information that identifies a set of cloud-based key-value data store buckets from which objects are included in a protection group;
      filter information that indicates subsets of key-value objects from the set of data store buckets to be backed up; and
      policy information that indicates parameters for performing backups of the objects indicated by the filter information;

generating, based on the protection group information, object-level incremental backup data for a backup of objects from the set of key-value data store buckets, wherein the object-level incremental backup data includes data for individual key-value objects that have changed subsequent to a previous backup;

storing the incremental backup data in multiple cloud-based key-value data store backup buckets;

performing, based on the protection group information, a query across the multiple backup buckets; and providing backed-up objects that satisfy the query from multiple buckets of the backup buckets.

15. The non-transitory computer-readable medium of claim 14, wherein the filter information includes key field filter information, one or more storage classes, and version criteria for data store buckets to be backed up.

16. The non-transitory computer-readable medium of claim 14, wherein the policy information includes backup frequency and target storage tier information for performing backups of the data store buckets, and wherein the target storage tier information is selected from multiple target storage tiers, including at least a first tier having a first access time attribute, and a second tier having a second, different access time attribute.

17. The non-transitory computer-readable medium of claim 14, wherein the operations further comprise:

performing a query to determine a first set of objects that are no longer referenced by the incremental backup data due to expiration of one or more backups; and determining an amount of storage resources associated with the first set of objects.

18. A system, comprising:

at least one processor;

one or more memories having program instructions stored thereon that are executable by the at least one processor to:

determine protection group information that includes:
bucket information that identifies a set of cloud-based key-value data store buckets from which objects are included in a protection group;
filter information that indicates subsets of key-value objects from the set of data store buckets to be backed up; and
policy information that indicates parameters for performing backups of the objects indicated by the filter information;

generate based on the protection group information, object-level incremental backup data for a backup of objects from the set of key-value data store buckets, wherein the object-level incremental backup data includes data for individual key-value objects that have changed subsequent to a previous backup;

store the incremental backup data in multiple cloud-based key-value data store backup buckets;

perform, based on the protection group information, a query across the multiple backup buckets; and provide backed-up objects that satisfy the query from multiple buckets of the backup buckets.

* * * * *